United States Patent
MacKarvich et al.

(10) Patent No.: US 11,753,836 B2
(45) Date of Patent: Sep. 12, 2023

(54) FALL PROTECTION SYSTEM

(71) Applicant: Tie Down, Inc., Atlanta, GA (US)

(72) Inventors: Charles J. MacKarvich, Atlanta, GA (US); Justin Hikaru Alcober, Smyrna, GA (US); Sean Davis, Powder Springs, GA (US)

(73) Assignee: Tie Down, Inc., Atlanta, GA (US)

( * ) Notice: Subject to any disclaimer, the term of this patent is extended or adjusted under 35 U.S.C. 154(b) by 0 days.

(21) Appl. No.: 17/578,295

(22) Filed: Jan. 18, 2022

(65) Prior Publication Data

US 2023/0228108 A1 Jul. 20, 2023

(51) Int. Cl.
*E04G 21/32* (2006.01)

(52) U.S. Cl.
CPC ................................ *E04G 21/3219* (2013.01)

(58) Field of Classification Search
CPC .......... E04G 21/3219; E04G 21/3204; E04G 21/3223; E04G 5/14
USPC .......................................................... 256/59
See application file for complete search history.

(56) References Cited

U.S. PATENT DOCUMENTS

| | | | |
|---|---|---|---|
| 346,644 A * | 8/1886 | Crisp .................. | E04H 17/1447 256/22 |
| 361,001 A * | 4/1887 | Devens ............... | E04H 12/2215 52/165 |
| 380,627 A * | 4/1888 | Harmon .................. | E04H 17/12 52/154 |
| 406,642 A * | 7/1889 | Frost ....................... | E04H 17/08 254/223 |
| 412,766 A * | 10/1889 | Lounsberry ......... | E04H 12/2215 52/154 |
| 432,930 A * | 7/1890 | Bond ...................... | E04H 17/12 256/48 |
| 511,378 A * | 12/1893 | Van Wagoner ....... | E04H 17/124 256/48 |
| 572,719 A * | 12/1896 | Reppeto ................ | E04H 17/124 256/52 |

(Continued)

FOREIGN PATENT DOCUMENTS

| | | |
|---|---|---|
| DE | 102010025513 | 12/2011 |
| DE | 202018100633 | 2/2019 |
| WO | 2010085872 | 8/2010 |

OTHER PUBLICATIONS

Mackarvich, Charles J.; Non-Final Office Action for U.S. Appl. No. 17/953,235, filed Sep. 26, 2022, dated Mar. 2, 2023, 30 pgs.

(Continued)

*Primary Examiner* — Daniel P Cahn
*Assistant Examiner* — Shiref M Mekhaeil
(74) *Attorney, Agent, or Firm* — Taylor English Duma LLP

(57) ABSTRACT

A fall protection system includes a substantially vertical guardrail post defining a first post side and a second post side; a lateral safety guardrail extending substantially horizontally from the guardrail post; and a pillar attachment assembly comprising a pillar attachment device and a flexible pillar attachment strap, the pillar attachment device mounted to the first post side of the guardrail post, and the flexible pillar attachment strap extending substantially horizontally from the pillar attachment device and configured to wrap around a structural component, wherein a free end of the pillar attachment strap opposite the pillar attachment device is releasably secured to the guardrail post.

11 Claims, 18 Drawing Sheets

(56) References Cited

U.S. PATENT DOCUMENTS

| | | | | |
|---|---|---|---|---|
| 589,898 A * | 9/1897 | Johnston | E04H 17/12 256/53 |
| 613,078 A * | 10/1898 | Robbins | E04H 17/055 256/57 |
| 636,855 A * | 11/1899 | Sawyer | E04H 17/12 256/65.02 |
| 759,344 A * | 5/1904 | Carolan | E04H 17/12 256/51 |
| 776,624 A * | 12/1904 | Steward | E04H 17/124 256/52 |
| 793,371 A * | 6/1905 | Hansberger | E04H 17/124 256/54 |
| 858,345 A * | 6/1907 | Kaufman | E04H 17/124 256/57 |
| 869,231 A * | 10/1907 | Colvin | E04H 17/12 101/180 |
| 997,725 A * | 7/1911 | Wilson | E04H 17/08 256/37 |
| 1,004,308 A * | 9/1911 | Stidworthy | F16G 1/28 474/237 |
| 1,036,447 A * | 8/1912 | Bushnell | E04H 17/124 256/55 |
| 1,050,589 A * | 1/1913 | Young | E04H 17/124 256/48 |
| 1,793,106 A * | 2/1931 | Lindemuth | E04H 17/124 52/153 |
| 1,804,420 A * | 5/1931 | Kelley | E04B 9/18 52/351 |
| 2,065,562 A * | 12/1936 | Brown | E04H 17/12 256/DIG. 5 |
| 2,222,249 A * | 11/1940 | Borgen | E04H 17/12 256/48 |
| 2,227,553 A * | 1/1941 | Paque | E04H 17/06 52/153 |
| 2,351,261 A * | 6/1944 | Hall | E04H 17/24 256/11 |
| 2,369,225 A * | 2/1945 | George | A44B 11/125 24/193 |
| 2,470,318 A * | 5/1949 | Nadelson | A63B 67/045 160/368.1 |
| 2,515,615 A * | 7/1950 | Tetzlaff | E04H 17/12 256/48 |
| 2,573,239 A * | 10/1951 | Barrett | E04H 17/1447 256/22 |
| 3,880,405 A * | 4/1975 | Brueske | E04G 21/3285 248/237 |
| D245,792 S * | 9/1977 | Dougherty | D25/128 |
| 4,058,882 A * | 11/1977 | Muckelrath | E04H 17/124 29/445 |
| 4,268,012 A * | 5/1981 | Ruehle | B60P 7/083 254/223 |
| D260,855 S | 9/1981 | Hobson | |
| 4,475,854 A * | 10/1984 | Ericsson | B60P 7/083 D34/33 |
| 4,604,773 A * | 8/1986 | Weber | B60R 22/00 242/388.3 |
| 4,782,915 A * | 11/1988 | King | E04G 21/28 182/47 |
| 4,787,602 A * | 11/1988 | Pidgeon | E01F 13/02 403/348 |
| 4,823,443 A * | 4/1989 | Waters | B61D 45/00 24/68 CD |
| 4,879,800 A * | 11/1989 | Rumman | A47B 13/12 446/116 |
| 4,932,634 A * | 6/1990 | Sura | E01F 7/02 256/48 |
| 5,165,499 A * | 11/1992 | Bell | E04G 21/3261 182/9 |
| 5,282,706 A * | 2/1994 | Anthony | B60P 3/10 410/97 |
| 5,307,897 A * | 5/1994 | Turner | E04G 21/3261 182/113 |
| 5,319,870 A * | 6/1994 | Weiss | G09F 7/18 40/604 |
| 5,350,155 A * | 9/1994 | Burk | E04H 17/12 256/48 |
| 5,655,623 A * | 8/1997 | Skyba | E06C 1/381 182/100 |
| 5,727,648 A * | 3/1998 | Jenkins, Jr. | E06C 7/081 182/187 |
| 5,816,362 A * | 10/1998 | Jenkins, Jr. | E06C 7/081 182/189 |
| 6,021,702 A * | 2/2000 | Rexroad | E04G 5/12 87/13 |
| 6,029,556 A * | 2/2000 | Rexroad | E04G 21/24 87/22 |
| 6,158,092 A * | 12/2000 | Huang | B60P 7/0838 24/68 CD |
| 6,241,174 B1 * | 6/2001 | Nelsen | B65H 54/585 242/388.3 |
| 6,547,218 B2 * | 4/2003 | Landy | B60P 7/083 24/68 CD |
| 6,665,910 B2 * | 12/2003 | Huang | B60P 7/083 24/68 CD |
| 6,681,892 B2 * | 1/2004 | Husband | E06C 1/34 182/187 |
| 6,705,597 B1 * | 3/2004 | Reilly | B60P 7/0846 254/223 |
| 6,779,630 B2 * | 8/2004 | Choate | A62B 35/0056 182/36 |
| 7,080,967 B2 * | 7/2006 | Ackerman | B60P 7/0876 410/118 |
| 7,140,802 B2 * | 11/2006 | Lamore | E01F 13/12 404/6 |
| 7,360,753 B1 * | 4/2008 | Lin | B25B 25/00 254/218 |
| 7,448,596 B1 * | 11/2008 | Chang | F16G 11/12 254/218 |
| D590,068 S * | 4/2009 | Woller | D25/64 |
| 7,566,047 B2 * | 7/2009 | Wall | E04H 17/1413 256/48 |
| 7,651,072 B1 * | 1/2010 | Chang | B60P 7/083 254/218 |
| 7,845,621 B1 * | 12/2010 | Lu | B66F 3/005 254/218 |
| 8,424,852 B2 * | 4/2013 | Anson | E04G 21/3219 256/45 |
| D709,361 S | 7/2014 | Caldwell | |
| 8,814,145 B2 * | 8/2014 | Herman | G01B 3/14 256/48 |
| 8,925,904 B2 * | 1/2015 | Christoffer | E04H 17/009 182/113 |
| 9,156,507 B1 * | 10/2015 | Reed | B60R 5/041 |
| 9,567,768 B1 * | 2/2017 | Galla | E04G 21/3266 |
| D852,614 S | 7/2019 | Schloss | |
| D852,615 S | 7/2019 | Schloss | |
| 10,793,052 B1 * | 10/2020 | Rafuse | B60P 7/0846 |
| 10,814,774 B2 * | 10/2020 | Millett | B60P 7/0892 |
| 10,857,930 B1 * | 12/2020 | Levi | B60P 7/083 |
| D909,860 S | 2/2021 | Johnston et al. | |
| 10,988,071 B2 * | 4/2021 | Kingery | B60P 7/0823 |
| D925,348 S | 7/2021 | Norfleet et al. | |
| 11,198,038 B1 * | 12/2021 | Power, II | A01M 31/02 |
| 2002/0063248 A1 | 5/2002 | Siegler et al. | |
| 2002/0096396 A1 * | 7/2002 | Harmston | E06C 1/10 182/93 |
| 2003/0098202 A1 * | 5/2003 | Husband | E06C 1/34 182/93 |
| 2004/0135134 A1 * | 7/2004 | Rice | E04G 21/3223 256/32 |
| 2004/0216952 A1 * | 11/2004 | Woller | A01M 31/00 182/100 |
| 2006/0180800 A1 * | 8/2006 | Tremblay | B60P 7/0846 254/219 |
| 2007/0034165 A1 * | 2/2007 | Yang | A01K 27/001 119/863 |
| 2007/0176401 A1 * | 8/2007 | Adshead | A62B 1/22 280/733 |

(56) References Cited

U.S. PATENT DOCUMENTS

| | | | | |
|---|---|---|---|---|
| 2008/0173854 | A1* | 7/2008 | Meaux | E01F 13/02 |
| | | | | 256/23 |
| 2014/0102829 | A1* | 4/2014 | Stearns | A62B 1/22 |
| | | | | 182/139 |
| 2016/0250961 | A1* | 9/2016 | Tolly | B60P 7/0846 |
| | | | | 410/100 |
| 2016/0347233 | A1* | 12/2016 | Kingery | B60P 7/0846 |
| 2018/0340343 | A1* | 11/2018 | Carpenter | B66F 9/0655 |
| 2019/0143159 | A1* | 5/2019 | Grant | E04G 21/3204 |
| | | | | 248/636 |
| 2019/0381929 | A1* | 12/2019 | Millett | B60R 7/02 |
| 2021/0238872 | A1* | 8/2021 | Brim, III | E04G 21/3223 |
| 2023/0228109 | | 7/2023 | Mackarvich et al. | |

OTHER PUBLICATIONS

Mackarvich, Charles J.; Non-Final Office Action for Design U.S. Appl. No. 29/868,602, filed Dec. 8, 2022, dated Apr. 13, 2023, 14 pgs.

Mackarvich, Charles J.; Extended European Search Report for application No. 22215180.5, filed Dec. 20, 2022, dated May 23, 2023, 7 pgs.

Mackarvich, Charles J.; Notice of Allowance for U.S. Appl. No. 17/953,235, filed Sep. 26, 2022, dated Jun. 21, 2023, 23 pgs.

* cited by examiner

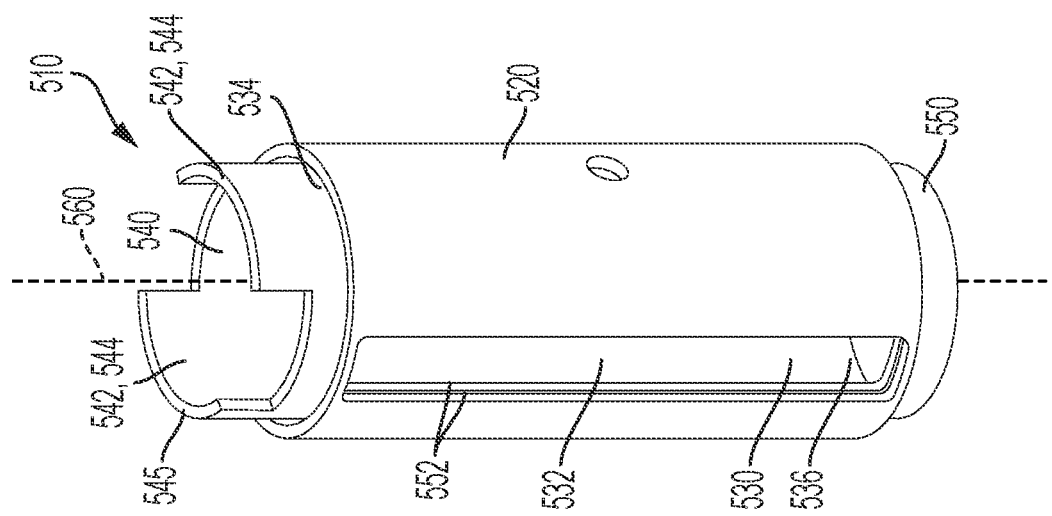
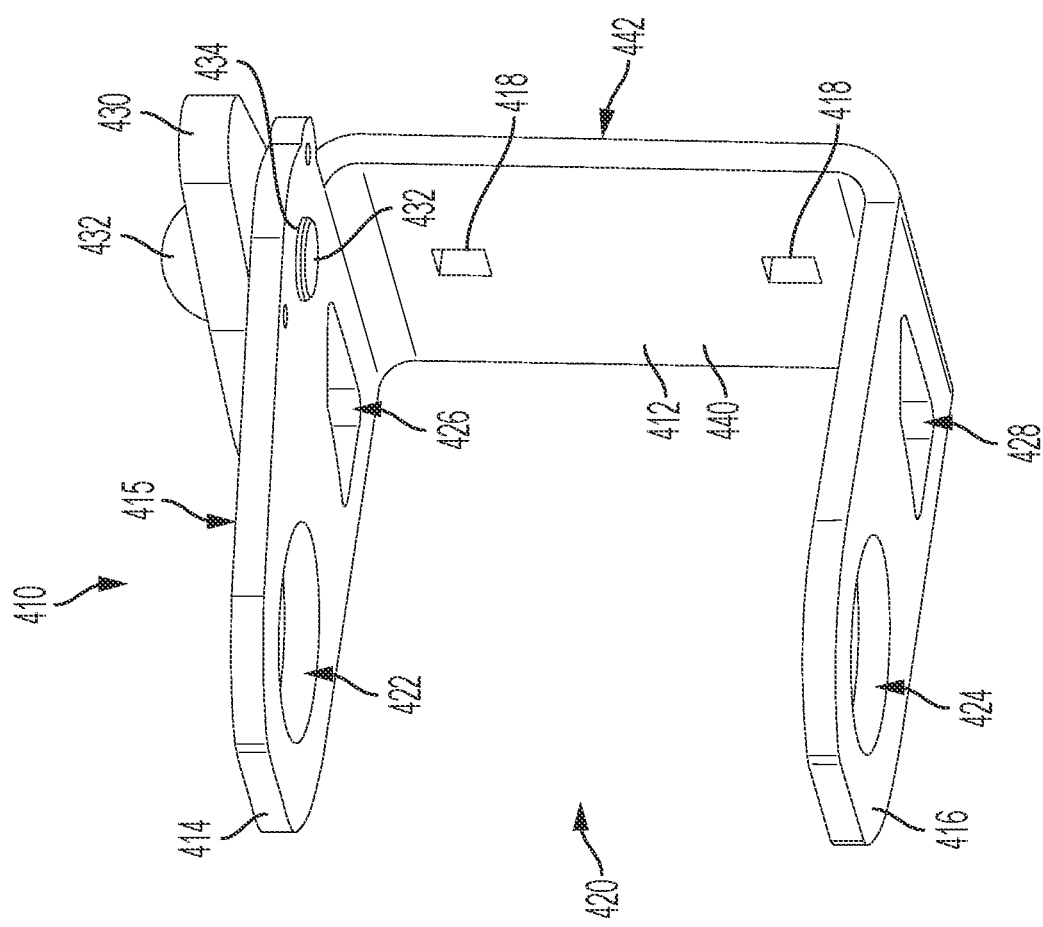

_US 11,753,836 B2_

FALL PROTECTION SYSTEM

TECHNICAL FIELD

This disclosure relates to building construction. More specifically, this disclosure relates to a fall protection system for securing a safety guardrail to a vertical pillar.

BACKGROUND

Building structures under construction often have elevated surfaces, such as elevated floor slabs, that require guardrails or other safety measures to prevent accidental falls. Guardrails are typically placed at a perimeter of the elevated surface and are secured to structural components of the building structure, such as pillars. However, guardrail systems frequently are unable to adapt pillars of varying sizes and shapes. Additionally, guardrails that are not properly secured can move and can fail to prevent falls from the elevated surface. Furthermore, guardrails that extend long distances between adjacent pillars can lack strength and stability at and around their midpoints.

SUMMARY

It is to be understood that this summary is not an extensive overview of the disclosure. This summary is exemplary and not restrictive, and it is intended neither to identify key or critical elements of the disclosure nor delineate the scope thereof. The sole purpose of this summary is to explain and exemplify certain concepts of the disclosure as an introduction to the following complete and extensive detailed description.

Disclosed is a fall protection system comprising a substantially vertical guardrail post defining a first post side and a second post side; a lateral safety guardrail extending substantially horizontally from the guardrail post; and a pillar attachment assembly comprising a pillar attachment device and a flexible pillar attachment strap, the pillar attachment device mounted to the first post side of the guardrail post, and the flexible pillar attachment strap extending substantially horizontally from the pillar attachment device and configured to wrap around a structural component, wherein a free end of the pillar attachment strap opposite the pillar attachment device is releasably secured to the guardrail post.

Also disclosed is a fall protection system comprising a guardrail support frame comprising: a substantially vertical first guardrail post; a substantially vertical second guardrail post; and a substantially vertical reinforcement post disposed between the first and second guardrail posts; a first pillar attachment assembly configured to secure the first guardrail post to a first structural component and a second pillar attachment assembly configured to secure the second guardrail post to a second structural component; and a flexible lower guardrail strap and a flexible upper guardrail strap, each of the lower and upper guardrail straps coupled to and extending laterally between the first guardrail post and the second guardrail post; wherein the reinforcement post engages each of the lower and upper guardrail straps, and wherein the reinforcement post is configured to be freestanding.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures may be designated by matching reference characters for the sake of consistency and clarity.

FIG. 4 is a perspective view of a pillar attachment bracket of the fall protection system of FIG. 1.

FIG. 5 is a perspective view of a pillar strap mount of the fall protection system of FIG. 1.

DETAILED DESCRIPTION

Figure 1:
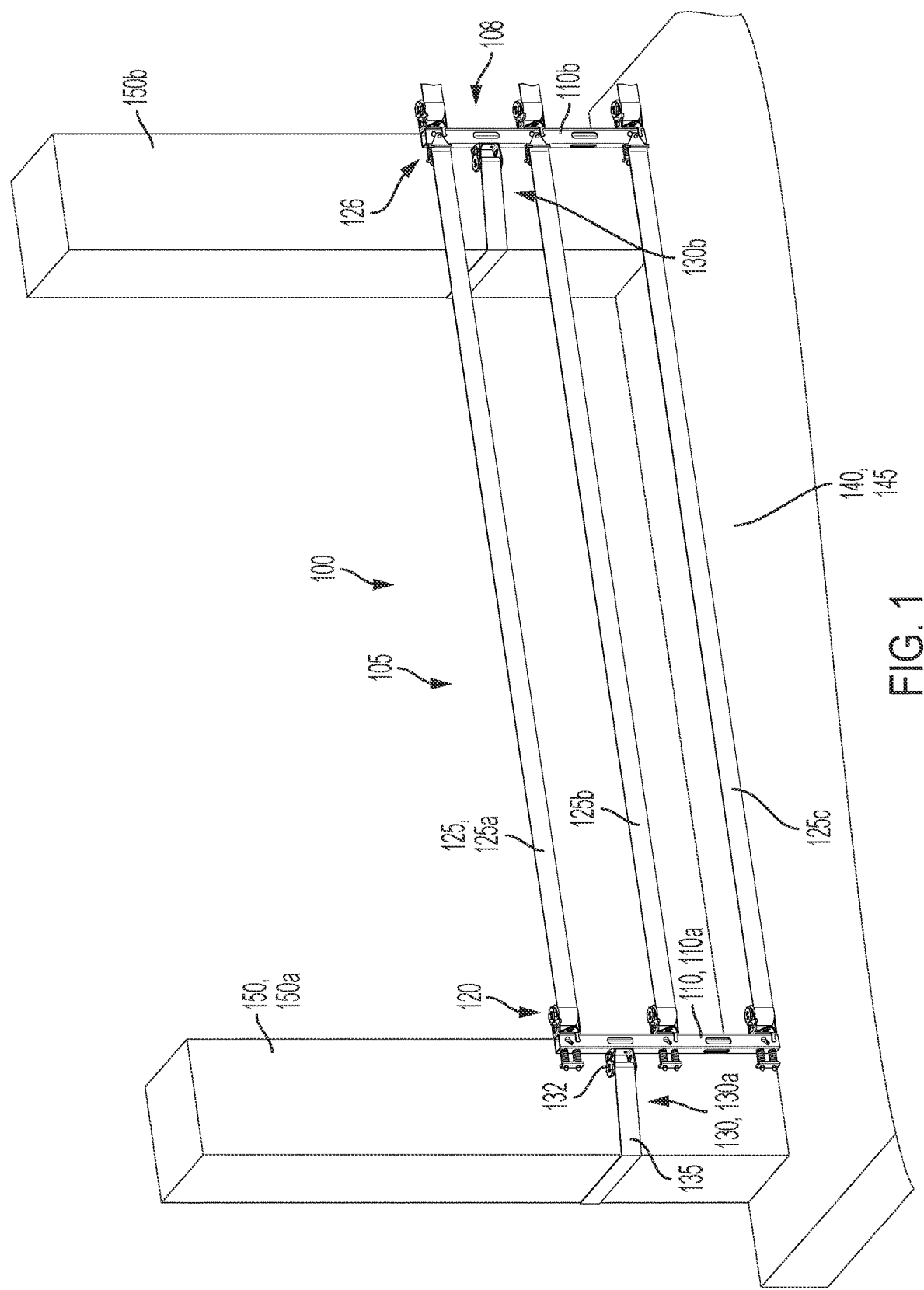
FIG. 1 is a perspective view of a fall protection system coupled to and extending between first and second vertical pillars, in accordance with one aspect of the present disclosure.

The present disclosure can be understood more readily by reference to the following detailed description, examples, drawings, and claims, and the previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching of the present devices, systems, and/or methods in its best, currently known aspect. To this end, those skilled in the relevant art will recognize and appreciate that many changes can be made to the various aspects of the present devices, systems, and/or methods described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to "an element" can include two or more such elements unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

Disclosed in the present application is a fall protection system and associated methods, systems, devices, and various apparatus. The fall protection system can comprise a guardrail posts and a guardrail strap extending therefrom. It would be understood by one of skill in the art that the disclosed fall protection system is described in but a few exemplary aspects among many. No particular terminology or description should be considered limiting on the disclosure or the scope of any claims issuing therefrom.

FIG. 1 illustrates a fall protection system 100 in accordance with a first aspect of the present disclosure. The fall protection system 100 can be secured to a structural component of a structure, such as a building structure 140 under construction, to prevent accidental falls from an elevated slab 145 or elevated surface of the building structure 140. The structural component can be a substantially vertical pillar 150, for example and without limitation. In the present aspect, the building structure 140 can comprise the elevated slab 145 and at least one of the substantially vertical pillars 150 extending upward therefrom, and the fall protection system 100 can be coupled to the at least one pillar 150. In the present aspect, the at least one pillar 150 can comprise a first pillar 150a and a second pillar 150b, and the fall protection system 100 can be coupled to and can extend between the first and second pillars 150a,b. In other aspects, the building structure 140 can comprise more or fewer pillars 150. For example, the building structure 140 may comprise additional pillars 150 and the fall protection system 100 can be coupled to and can extend between the additional pillars 150.

Example aspects of the fall protection system 100 can comprise a guardrail support frame 108. The guardrail support frame 108 can comprise at least one substantially vertical guardrail post 110. Each of the guardrail posts 110 can be secured to a corresponding one of the vertical pillars 150. For example, in the present aspect, the guardrail posts 110 can comprise at least a first guardrail post 110a secured to the first pillar 150a and a second guardrail post 110b secured to the second pillar 150b. According to example aspects, each of the guardrail posts 110 can comprise a metal material, such as steel. In some aspects, the guardrail posts 110 can be formed as extruded steel posts. In other aspects, the guardrail posts 110 can comprise any other suitable material known in the art, including but not limited to other metals, and/or can be manufactured using any other desired method. Moreover, in other aspects, the fall protection system 100 can comprise more or fewer guardrail posts 110.

For example, the fall protection system 100 may comprise additional guardrail posts 110, each of which can be secured to an additional pillar 150.

The fall protection system 100 can further comprising one or more lateral safety guardrails 125 supported by the guardrail support frame 108. In the present aspect, the lateral safety guardrails 125 can extend laterally between the first and second guardrail posts 110a,b, and thus, can extend between the first and second pillars 150a,b. The lateral safety guardrails 125 can be oriented about horizontally, as shown in the present aspect, or can be oriented at an acute angle relative to horizontal. In the present aspect, each of the lateral safety guardrails 125 can be formed as a flexible guardrail strap 125. In other aspects, the lateral safety guardrails 125 can be semi-rigid or rigid. Furthermore, in the present aspect, the guardrail straps 125 can comprise an upper guardrail strap 125a, a middle guardrail strap 125b, and a lower guardrail strap 125c. Other aspects of the fall protection system 100 can comprise more or fewer of the guardrail straps 125 extending between the first and second guardrail posts 110a,b. Example aspects of the guardrail straps 125 can comprise a plastic material, such as, for example, nylon webbing. In other aspects, the guardrail straps 125 can comprise any other suitable material known in the art. In some aspects, the guardrail straps 125 can be inelastic or semi-inelastic, while in other aspects, the guardrail straps 125 can be elastic. Additionally, in example aspects, a length of each guardrail strap 125 can be sized to accommodate varying distances between the first and second guardrail posts 110a,b.

According to example aspects, each of the guardrail straps 125 can be mounted to the first guardrail post 110a by a corresponding guardrail attachment assembly 120. The guardrail attachment assemblies 120 can be vertically spaced along a length of the first guardrail post 110a, as shown. In example aspects, each of the guardrail straps 125 can be rolled up on the corresponding guardrail attachment assembly 120. To extend each of the guardrail straps 125 from the first guardrail post 110a to the second guardrail post 110b, the guardrail strap 125 can be unrolled or partially unrolled by pulling a free end 126 of the guardrail strap 125 towards the second guardrail post 110b. The free end 126 can be releasably secured to the second guardrail post 110b and the guardrail strap 125 can be held taut between the first and second guardrail posts 110a,b, as described in further detail below. With the guardrail straps 125 extended between the first and second guardrail posts 110a,b, the fall protection system 100 can define a substantially upright boundary 105 between the first and second pillars 150a,b, as shown.

As previously described, in some aspects, the fall protection system 100 can extend between additional pillars 150. As shown, in the present aspect, the fall protection system 100 can comprise a plurality of additional guardrail straps 125, each mounted to the second guardrail post 110b by an additional one of the guardrail attachment assemblies 120. Each of the additional guardrail straps 125 can be configured to extend between the second pillar 150b and an adjacent third pillar (not shown) of the building structure 140.

Example aspects of the fall protection system 100 can further comprise one or more pillar attachment assemblies 130. Each of the pillar attachment assemblies 130 can be configured to couple a corresponding one of the guardrail posts 110 to the corresponding vertical pillar 150. Securing the upright boundary 105 to the vertical pillars 150 can prevent movement thereof and ensure safe and proper functioning of the fall protection system 100. For example, the pillar attachment assemblies 130 can comprise a first pillar attachment assembly 130a coupling the first guardrail post 110a to the first pillar 150a and a second pillar attachment assembly 130b coupling the second guardrail post 110b to the second pillar 150b. As shown, each pillar attachment assembly 130 can comprise a pillar attachment device 132 and a pillar attachment strap 135 that can be rolled up on the pillar attachment device 132. Each pillar attachment device 132 can be mounted to the corresponding guardrail post 110, and the corresponding pillar attachment strap 135 can extend from the pillar attachment device 132 and wrap fully around the corresponding pillar 150. To wrap the pillar attachment strap 135 around the pillar 150, the pillar attachment strap 135 can be unrolled or partially unrolled by pulling a free end 710 (shown in FIG. 7A) thereof around the pillar 150. The free end 710 can then be releasably coupled to the corresponding guardrail post 110 to secure the pillar attachment strap 135 tautly around the pillar 150. In the present aspect, only one of the pillar attachment assemblies 130 secures each of the first and second guardrail posts 110a,b to the corresponding first and second pillars 150a,b. However, in other aspects, the fall protection system 100 can comprise additional pillar attachment assemblies 130 for securing each of the first and second guardrail posts 110a,b to the first and second pillars 150a,b. According to example aspects, a length of each pillar attachment strap 135 can be sized to accommodate pillars 150 of varying thicknesses.

Figure 2:
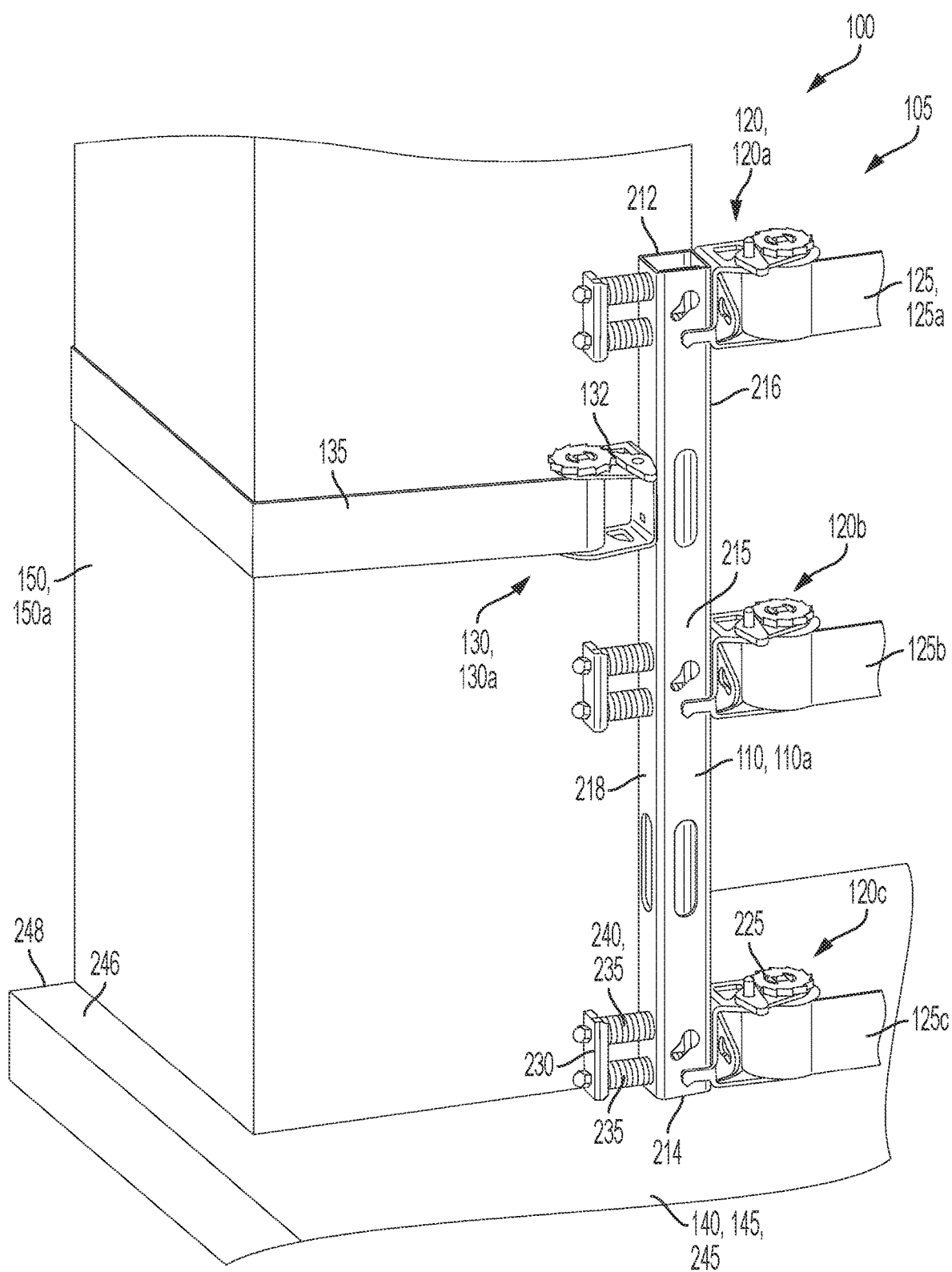
FIG. 2 is a perspective view of a guardrail post of the fall protection system of FIG. 1 coupled to the first vertical pillar.

FIG. 2 illustrates a perspective view of the first guardrail post 110a secured to the first pillar 150a. According to example aspects, the elevated slab 145 can be, for example, an elevated floor slab 245, as shown. Elevated floor slabs 245 can be found in a commercial building, for example and without limitation, such as high-rise offices and hotels. The pillars 150 can extend substantially vertically between the elevated floor slab 245 and an elevated ceiling slab, to support the elevated ceiling slab above the elevated floor slab 245. Example aspects of the elevated floor slab 245 can comprise concrete or any other suitable material. The elevated floor slab 245 can be oriented substantially horizontally, and can define an upper floor surface 246 from which the pillars 150 can extend. In example aspects, each of the guardrail posts 110 can define an upper post end 212 and a lower post end 214. The lower post end 214 can generally confront or rest on the upper floor surface 246, and the guardrail post 110 can extend substantially vertically upward therefrom, as shown. The elevated floor slab 245 can further define a peripheral edge 248, and the fall protection system 100 can be mounted to pillars 150 at or near the peripheral edge 248. Thus, the upright boundary 105 formed by the fall protection system 100 can prevent accidental falls off the elevated slab 145 at the peripheral edge 248 thereof. In some aspects, the fall protection system 100 can extend fully along or around the peripheral edge 248 of the elevated slab 145. However, in other aspects, the fall protection system 100 may extend only partially along or around the peripheral edge 248.

As shown, the guardrail attachment assemblies 120 can comprise an upper guardrail attachment assembly 120a securing the upper guardrail strap 125a to the guardrail post 110 at or near the upper post end 212 thereof and a lower guardrail attachment assembly 120c securing the lower guardrail strap 125c to the guardrail post 110 at or near the lower post end 214 thereof. In example aspects, the lower guardrail strap 125c can extend along and can touch or nearly touch the upper floor surface 246. The lower guardrail strap 125c can define a height suitable to prevent loose objects (e.g., paint cans, tools, etc.) from rolling or sliding past the lower guardrail strap 125c and falling over the peripheral edge 248 of the elevated slab 145. A middle guardrail attachment assembly 120b can secure the middle guardrail strap 125b to a middle post region 215 of the guardrail post 110 between the upper post end 212 and the lower post end 214. According to example aspects, each of the guardrail attachment assemblies 120 can comprise a guardrail attachment device 225 secured to an inner post side 216 of the guardrail post 110 by a guardrail fastener assembly 230. In the present aspect, each of the guardrail fastener assemblies 230 can comprise a shock absorption mechanism 240 that can allow the guardrail fastener assembly 230 to compress and expand. In the present aspect, the shock absorption mechanism 240 can comprise one or more guardrail springs 235, or other resilient device(s) and can resiliently couple the corresponding guardrail strap 125 to the corresponding guardrail post 110. In example aspects, a user, such as a construction worker, can be secured to fall protection system 100 in case of an accidental fall. As described in further detail below, the expansion and compression of the guardrail springs 235 can provide shock absorption in the event of a fall, a near fall, or any other similar event wherein a pulling force is applied to the shock absorption mechanism 240.

In the present aspect, the pillar attachment device 132 of the pillar attachment assembly 130 can be mounted to an outer post side 218 of the guardrail post 110 vertically between the upper guardrail attachment assembly 120a and the middle guardrail attachment assembly 120b. The outer post side 218 of the guardrail post 110 can be substantially opposite the inner post side 216, as shown. In some aspects, an additional one of the pillar attachment assemblies 130 can be secured to the guardrail post 110 vertically between the lower guardrail attachment assembly 120c and the middle guardrail attachment assembly 120b. The pillar attachment strap 135 of the pillar attachment assembly 130 can extend from the pillar attachment device 132 and can wrap around the vertical pillar 150. The free end 710 (shown in FIG. 7A) of the pillar attachment strap 135 can be releasably secured to the inner post side 216 of the guardrail post 110 to couple to the guardrail post 110 to the pillar 150. In the present aspect, the pillar 150 can define a substantially square cross-sectional shape. However, the flexibility of the pillar attachment strap 135 can allow the pillar attachment strap 135 to conform to pillars 150 of any cross-sectional shape, including, for example and without limitation, circular, triangular, rectangular, and the like.

Figure 3A:
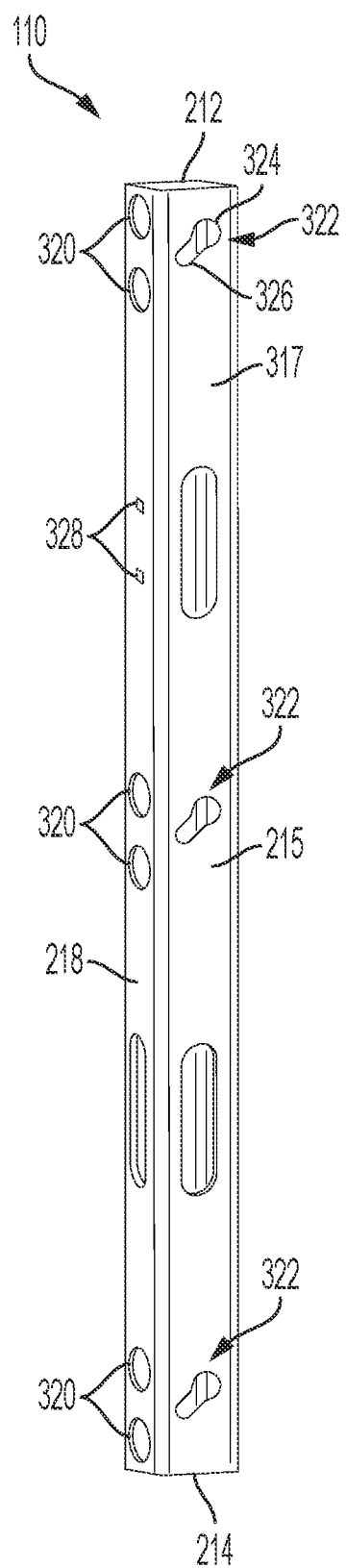
FIG. 3A is a perspective view of the guardrail post of FIG. 2
Figure 3B:
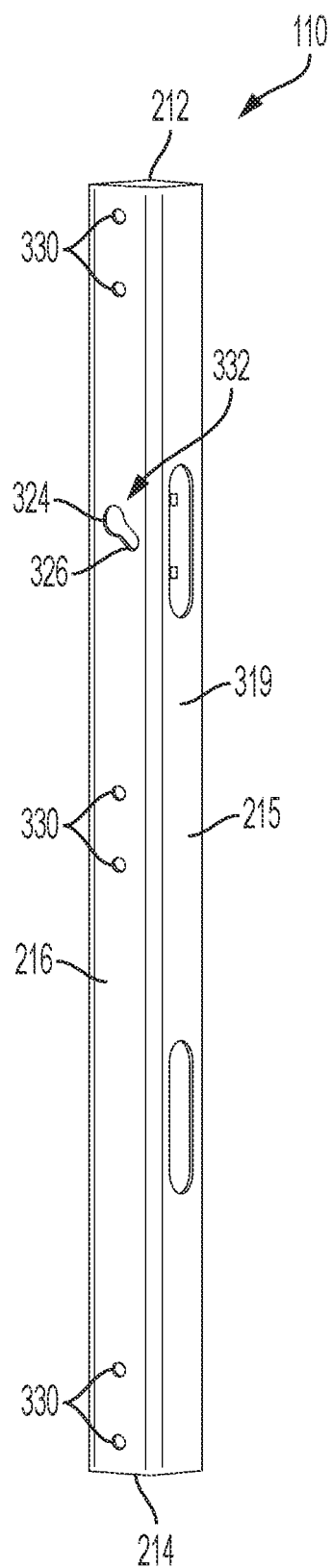
FIG. 3B is another perspective view of the guardrail post of FIG. 2.

FIGS. 3A and 3B illustrate front and rear perspective views of the guardrail post 110. Referring to FIG. 3A, the outer post side 218 and a front post side 317 of the guardrail post 110 are visible. As shown, a pair of outer guardrail fastener holes 320 can be formed through the outer post side 218 at or near each of the upper post end 212, the lower post end 214, and the middle post region 215. Each pair of outer guardrail fastener holes 320 can correspond to one of the guardrail fastener assemblies 230 (shown in FIG. 2), and each of the outer guardrail fastener holes 320 can be sized to allow a corresponding one of the guardrail springs 235 to extend therethrough. Additionally, a guardrail locking hole 322 can be formed through the front post side 317 at or near each of the upper post end 212, the lower post end 214, and the middle post region 215. Each of the guardrail locking holes 322 can define a wide portion 324 and a narrow portion 326, and can be configured to engage with the free end 126 (shown in FIG. 1) of a corresponding guardrail strap 125 (shown in FIG. 1) extending from an adjacent guardrail post 110. Example aspects of the guardrail post 110 can further define a pair of pillar fastener holes 328 formed through the outer post side 218 between the upper post end 212 and the middle post region 215. The pillar fastener holes 328 can correspond to pillar fasteners for mounting the pillar attachment assembly 130 (shown in FIG. 1) to the guardrail post 110, as described in further detail below.

Referring to FIG. 3B, the inner post side 216 and a rear post side 319 of the guardrail post 110 are visible. As shown, a pair of inner guardrail fastener holes 330 can be formed through the inner post side 216 at or near each of the upper post end 212, the lower post end 214, and the middle post region 215. Like the outer guardrail fastener holes 320 (shown in FIG. 3A), each pair of inner guardrail fastener holes 330 can correspond to one of the guardrail fastener assemblies 230 (shown in FIG. 2), as described in further detail below. The guardrail post 110 can also define a pillar locking hole 332 formed through the inner post side 216. The pillar locking hole 332 can be shaped like each of the guardrail locking holes 322 (shown in FIG. 3A) to define the wide portion 324 and the narrow portion 326, and the free end 710 (shown in FIG. 7A) of the corresponding pillar attachment strap 135 (shown in FIG. 1) can engage the pillar locking hole 332 to secure the pillar attachment strap 135 around the corresponding pillar 150 (shown in FIG. 1). According to example aspects, a locking portion 750 (shown in FIG. 7A) at the free end 710 of the pillar attachment strap 135 can be inserted through the wide portion 324 of the pillar locking hole 332 and then slid to the narrow portion 326 to prevent disengagement of the locking portion 750 from the pillar locking hole 332, as described in further detail below. The free ends 126 (shown in FIG. 1) of the guardrail straps 125 (shown in FIG. 1) can engage the corresponding guardrail locking holes 322 in the same manner.

FIG. 4 illustrates a mounting bracket 410 of the pillar attachment device 132 (shown in FIG. 1) in accordance with an example aspect of the present disclosure. As shown, the mounting bracket 410 can be substantially C-shaped. The mounting bracket 410 can define a bracket mounting wall 412, an upper bracket arm 414, and a lower bracket arm 416. The bracket mounting wall 412 can be oriented substantially vertically and can define an inner mounting wall surface 440 and an outer mounting wall surface 442 opposite the inner mounting wall surface 440. Additionally, the bracket mounting wall 412 can define a pair of bracket holes 418 therethrough. The pair of bracket holes 418 can be aligned with the pair of pillar fastener holes 328 (shown in FIG. 3A) formed through the guardrail post 110 (shown in FIG. 1), and a pillar fastener can extend through each of the aligned pillar fastener holes 328 and bracket holes 418 to couple the mounting bracket 410 to the guardrail post 110. Each of the upper bracket arm 414 and the lower bracket arm 416 can extend laterally from the bracket mounting wall 412, and an open bracket space 420 can be defined therebetween. As shown, an upper mounting opening 422 can be formed through the upper bracket arm 414 and a lower mounting opening 424 can be formed through the lower bracket arm 416. A strap mount 510 (shown in FIG. 5) can be received within the open bracket space 420 and can rotationally engage each of the upper mounting opening 422 and the lower mounting opening 424, as described in further detail below. Additionally, the upper bracket arm 414 can define an upper arm opening 426 between the upper mounting opening 422 and the bracket mounting wall 412, and the lower bracket arm 416 can define a lower arm opening 428 between the lower mounting opening 424 and the bracket mounting wall 412. In some aspects, the upper arm opening 426 and the lower arm opening 428 can be present to reduce material costs of producing the mounting bracket 410.

In example aspects, the mounting bracket 410 can be monolithically formed (i.e., formed a singular component that constitutes a single material without joints or seams). Example aspects of the mounting bracket 410 can comprise a rigid material, such as, for example, steel. More specifically, in some aspects, the mounting bracket 410 can be formed by laser-cutting and bending monolithic steel plates. However, in other aspects, the mounting bracket 410 may not be monolithically formed and/or may be manufactured using other desired methods, such as stamping, casting, or machining. In other aspects, the mounting bracket 410 can comprise any other suitable material or combination of materials having suitable durability, such as, for example, other metals, plastics, composites, and the like.

Additionally, according to example aspects, a pawl 430 can be pivotably mounted to an upper surface 415 of the upper bracket arm 414. In the present aspect, the pawl 430 can be disposed generally between the upper mounting opening 422 and the bracket mounting wall 412. The pawl 430 can be biased to the engaged position, wherein the pawl 430 can engage a ratchet 610 (shown in FIG. 6) to prohibit the ratchet 610 from rotating, and the ratchet 610 can be mounted to the strap mount 510, as described in further detail below. For example, the pawl 430 can be biased into engagement with the ratchet 610 by a pawl spring 2010 (shown in FIG. 20) or other resilient device. The pawl spring 2010 can allow the pawl 430 to be forced out of engagement with the ratchet 610 under the application of a suitable force, and then to spring back into engagement with the ratchet 610 when the force is insufficient or removed. In example aspects, a pawl fastener 432 can extend through a pawl fastener hole 434 in the upper bracket arm 414 to pivotably couple the pawl 430 to the upper bracket arm 414, as shown. The pawl fastener 432 can be, for example and without limitation, a bolt, a screw, or any other suitable fastener known in the art.

Figure 6:
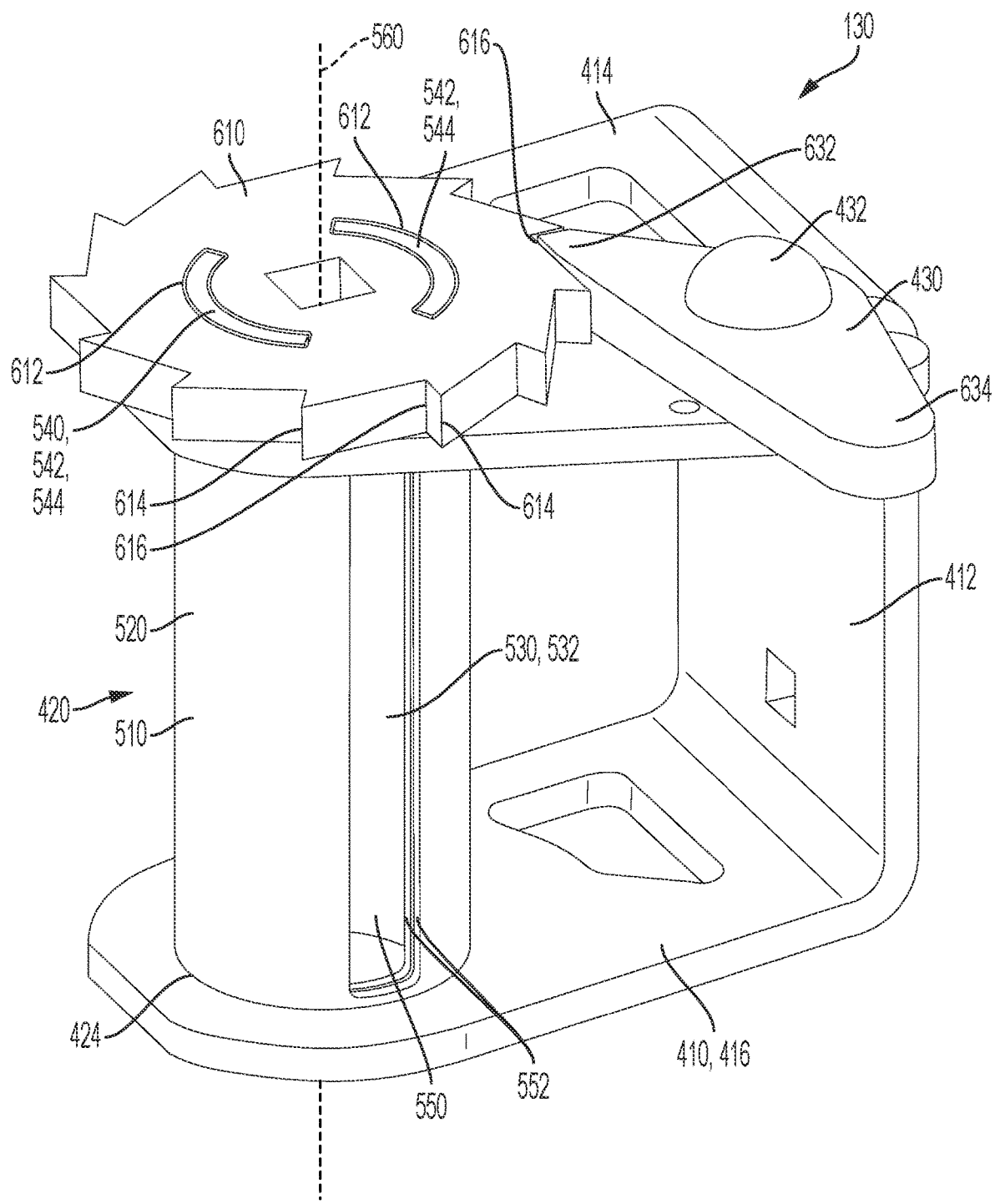
FIG. 6 is a perspective view of a pillar attachment device comprising the pillar attachment bracket and the pillar strap mount.

FIG. 5 illustrates an example aspect of the strap mount 510 of the pillar attachment device 132 (shown in FIG. 1). The strap mount 510 can comprise an outer mounting tube 520 and an inner mounting tube 530 extending through the outer mounting tube 520. As shown, each of the outer mounting tube 520 and inner mounting tube 530 can be substantially cylindrical in shape, and a tube axis 560 can extend centrally therethrough. In other aspects, either or both of the outer and inner mounting tubes 520, 530, or portions thereof, can define any other suitable shape. The inner mounting tube 530 can define a tube body 532, which can be aligned with and can extend between the upper and lower mounting openings 422, 424 (shown in FIG. 4) of the mounting bracket 410 (shown in FIG. 4). In example aspects, the inner mounting tube 530 can further define an upper engagement portion 540 that can extend from an upper body end 534 of the tube body 532 and a lower engagement portion 550 that can extend from a lower body end 536 of the tube body 532. The upper engagement portion 540 can rotatably engage the upper mounting opening 422, and the lower engagement portion 550 can rotatably engage the lower mounting opening 424. According to example aspects, the upper engagement portion 540 can define one or more ratchet engagement members 542 formed at an upper end 545 of the inner mounting tube 530. For example, the ratchet engagement members 542 can comprise a pair of arcuate engagement prongs 544, as shown. The engagement prongs 544 can be configured to engage the ratchet 610 to couple the ratchet 610 to the strap mount 510, as shown in FIG. 6. In other aspects, the ratchet 610 can be secured to the strap mount 510 by any other suitable fastener or fastening technique known in the art.

The inner mounting tube 530 can extend through the outer mounting tube 520, such that the outer mounting tube 520 can also be substantially aligned with the upper mounting opening 422 and the lower mounting opening 424. The outer mounting tube 520 can extend between the upper bracket arm 414 (shown in FIG. 4) and the lower bracket arm 416 (shown in FIG. 4), but not through the upper and lower mounting openings 422, 424. In example aspects, each of the outer mounting tube 520 and the inner mounting tube 530 can define a tube slot 552 formed therethrough. The tube slots 552 of the outer and inner mounting tubes 520, 530 can be aligned, as shown. In some aspects, a restrained end of the pillar attachment strap 135 (shown in FIG. 1) can be fed through the tube slot 552 of the outer mounting tube 520 and can be clamped between the outer and inner mounting tubes 520, 530. The pillar attachment strap 135 can then be rolled up around the outer mounting tube 520.

FIG. 6 illustrates the pillar attachment assembly 130. As shown, the pillar attachment assembly 130 can comprise the mounting bracket 410 and the strap mount 510 rotatably coupled to the mounting bracket 410. The strap mount 510 can be disposed substantially between the upper bracket arm 414 and the lower bracket arm 416. The upper engagement portion 540 of the inner mounting tube 530 can rotatably engage the upper mounting opening 422 (shown in FIG. 4) of the upper bracket arm 414, and the lower engagement portion 550 of the inner mounting tube 530 can rotatably engage the lower mounting opening 424 of the lower bracket arm 416. The arcuate engagement prongs 544 of the upper engagement portion 540 can engage arcuate ratchet slots 612 formed in the ratchet 610 to rotatably couple the ratchet 610 to the pillar attachment assembly 130. The strap mount 510 and the ratchet 610 can rotate about the tube axis 560 relative to the mounting bracket 410. As shown, the ratchet 610 can define a plurality of ratchet teeth 614 extending substantially radially outward therefrom, and a ratchet recess 616 can be defined between each adjacent pair of ratchet teeth 614.

As described above, the pawl 430 can be pivotably mounted to the upper bracket arm 414 by the pawl fastener 432, and can be biased into engagement with the ratchet 610 by the pawl spring 2010 (shown in FIG. 20) or other resilient device. In the engaged position, an engagement end 632 of the pawl 430 can engage one of the ratchet recesses 616 the ratchet 610, and the ratchet 610 and the strap mount 510 can be prohibited from rotating relative to the mounting bracket 410 until a suitable force is applied to push the pawl 430 out of engagement with the ratchet recess 616. As described above, the pillar attachment strap 135 (shown in FIG. 1) can be coupled to the strap mount 510 and can be unrolled to wrap around the pillar 150 (shown in FIG. 1). The pillar attachment strap 135 can be unrolled and extended around the pillar 150 by applying a pulling force to the pillar attachment strap 135. In example aspects, the pulling force can overcome the spring force of the pawl spring 2010 to allow the strap mount 510 and the ratchet 610 rotate relative to the mounting bracket 410. As the ratchet 610 rotates, each of the ratchet teeth 614 can force the engagement end 632 of the pawl 430 out of a foregoing one of the ratchet recesses 616, the ratchet tooth 614 can bypass the engagement end 632, and then the pawl spring 2010 can then bias the engagement end 632 into a following one of the ratchet recesses 616. If the pulling force on the pillar attachment strap 135 is removed or is insufficient, the ratchet 610 can again be prohibited from rotating relative to the mounting bracket 410. Thus, an unrolled length 810 (shown in FIG. 8) of the pillar attachment strap 135 can be fixed when the pawl 430 is in the engaged position. In some aspects, the engagement end 632 of the pawl 430 can also or alternatively be forced out of the engaged position by applying a force to a lever end 634 of the pawl 430, substantially opposite the engagement end 632. The force can be applied to the lever end 634 of the pawl 430, for example and without limitation, manually or by a tool.

Figure 7A:
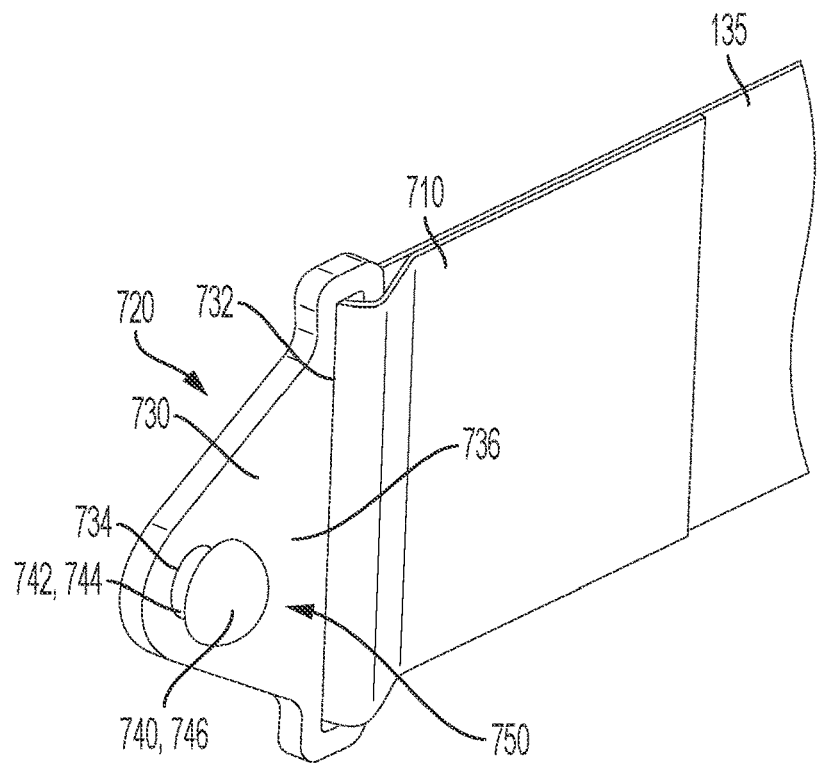
FIG. 7A is a perspective view of an end of a pillar attachment strap of the pillar attachment assembly of FIG. 6.
Figure 7B:
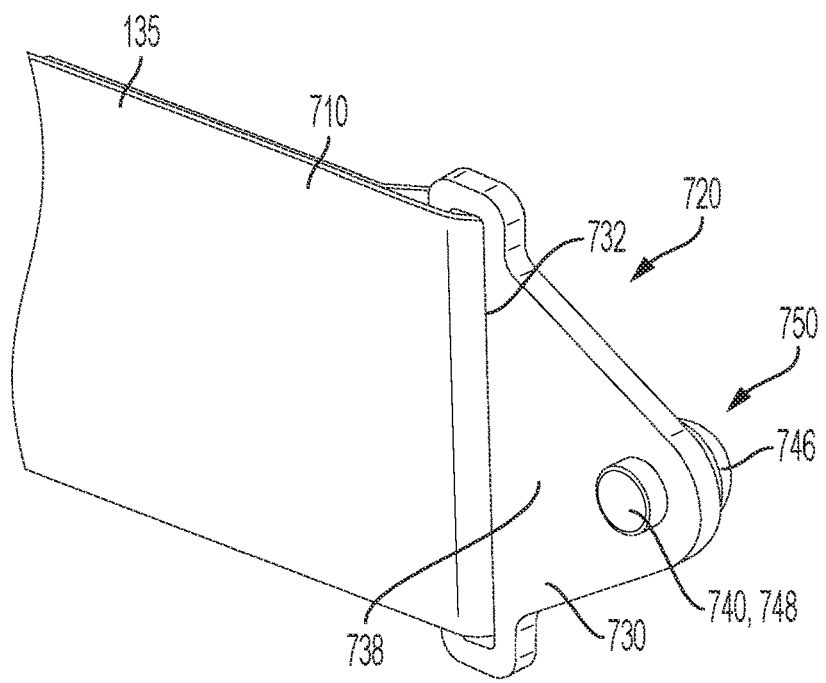
FIG. 7B is another perspective view of the end of the pillar attachment strap of FIG. 7A.

FIGS. 7A and 7B illustrate perspective views of the free end 710 of the pillar attachment strap 135. According to example aspects, a strap connector 720 can be attached to the free end 710, as shown. The strap connector 720 can comprise a connector plate 730 and a connector bolt 740. In the present aspect, the connector plate 730 can define a plate slot 732 formed therethrough, and the pillar attachment strap 135 can be looped through the plate slot 732 and secured to itself at the free end 710 thereof to secure the strap connector 720 to the pillar attachment strap 135. Example aspects of the connector bolt 740 can define a bolt rod 742 and a bolt head 746 secured to the bolt rod 742. The bolt rod 742 can extend through a plate opening 734 formed in the connector plate 730 and can be affixed thereto. The bolt head 746 can be coupled to the bolt rod 742 distal to the connector plate 730. In example aspects, the bolt head 746 can define a width and/or diameter that can be greater than a width and/or diameter of the bolt rod 742. As shown in FIG. 7A, the connector bolt 740 can define the locking portion 750, which can extend beyond an inner plate surface 736 of the connector plate 730. The locking portion 750 can comprise the bolt head 746, as well as an inner portion 744 of the bolt rod 742 that extends between the bolt head 746 and the inner plate surface 736. According to example aspects, to releasably secure the free end 710 of the pillar attachment strap 135 to the corresponding guardrail post 110 (shown in FIG. 1), the locking portion 750 of the connector bolt 740 can be inserted through the wide portion 324 (shown in FIG. 3A) of the corresponding pillar locking hole 332 (shown in FIG. 3B). The width of the bolt head 746 can be less than a width of the wide portion 324 to allow the locking portion 750 to be inserted therethrough. The locking portion 750 can then be slid into engagement with the narrow portion 326 (shown in FIG. 3B) of corresponding pillar locking hole 332, such that the inner portion 744 of the bolt rod 742 extends through the narrow portion 326 and the bolt head 746 is disposed within the guardrail post 110. The width of the bolt head 746 can be greater than the width of the narrow portion 326, and the greater width of the bolt head 746 can prohibit the bolt head 746 from passing through the narrow portion 326 of the pillar locking hole 332, thereby coupling the strap connector 720 to the guardrail post 110 and securing the pillar attachment strap 135 around the pillar 150 (shown in FIG. 1). One of the strap connectors 720 can also be coupled to the free end 126 (shown in FIG. 1) of the guardrail strap 125 (shown in FIG. 1) and can engage the guardrail locking hole 322 (shown in FIG. 3A) in the same manner. As shown in FIG. 7B, the connector plate 730 can define an outer plate surface 738 opposite the inner plate surface 736 (shown in FIG. 7A). In the present aspect, the connector bolt 740 can define a flattened distal rod end 748 abutting the inner plate surface 736.

Figure 8:
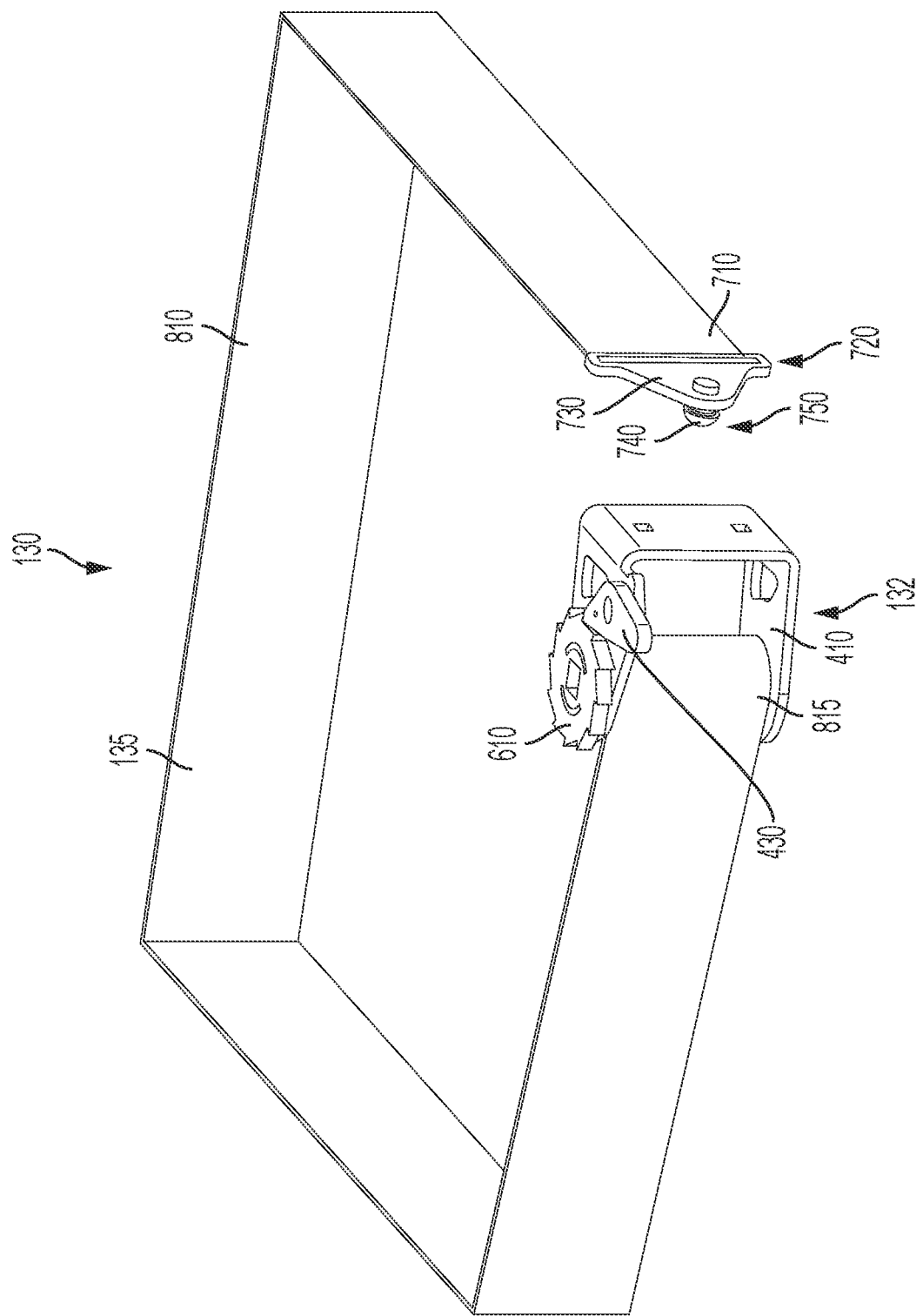
FIG. 8 is a perspective view of a pillar attachment assembly comprising the pillar attachment device of FIG. 6 and the pillar attachment strap of FIG. 7A.

FIG. 8 illustrates the pillar attachment assembly 130 comprising the pillar attachment device 132 and the pillar attachment strap 135. As shown, the pillar attachment strap 135 can be at least partially unrolled from the pillar attachment device 132, such that the unrolled length 810 of the pillar attachment strap 135 can wrap around the pillar 150 (shown in FIG. 1). If the pillar attachment strap 135 is not fully unrolled to wrap around the pillar 150, a rolled portion 815 of the pillar attachment strap 135 can remain rolled around the strap mount 510 (shown in FIG. 5) of the pillar attachment device 132.

Figure 9:
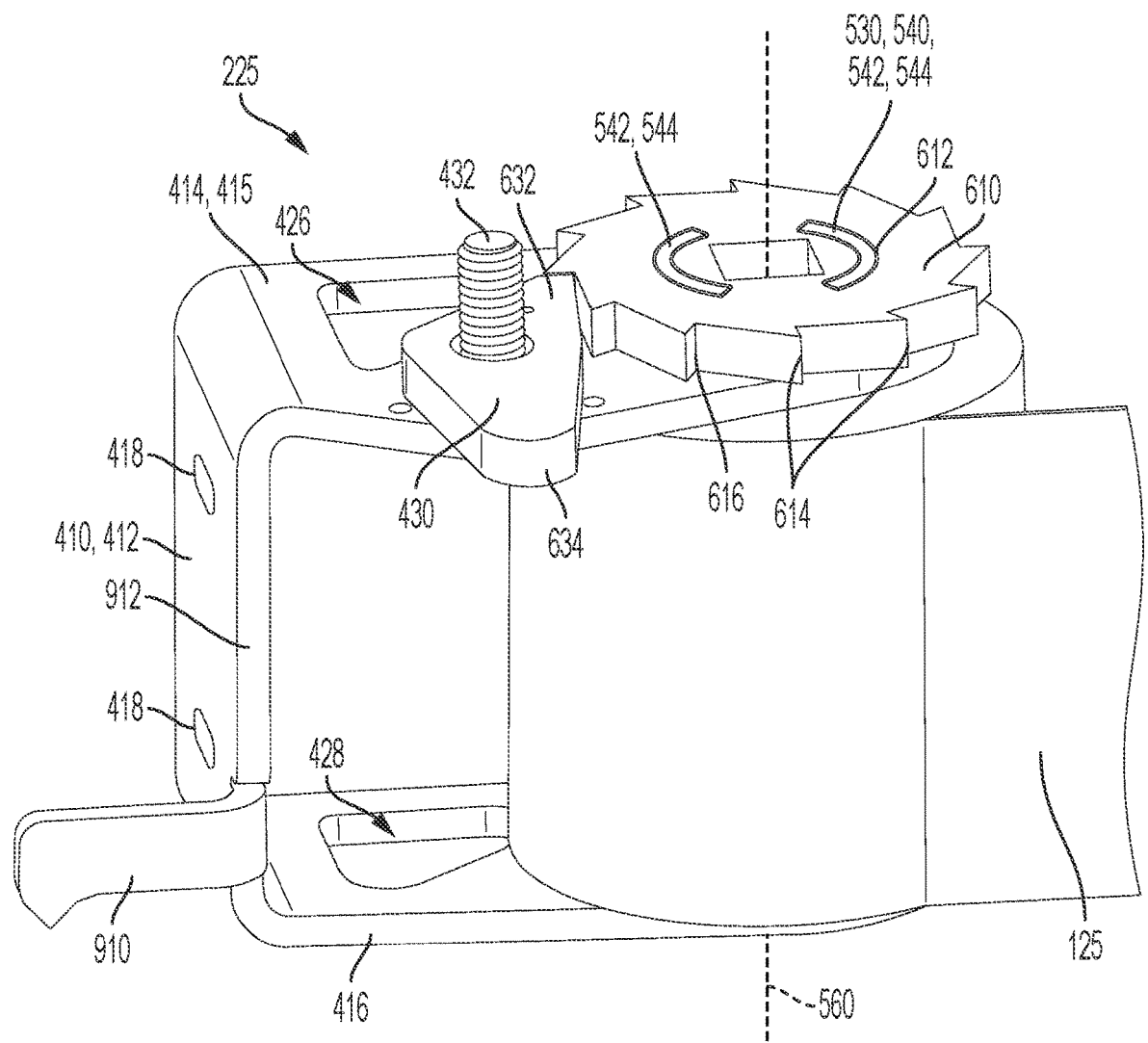
FIG. 9 is a perspective view of a guardrail attachment device of the fall protection system of FIG. 1.

FIG. 9 illustrates an example aspect of the guardrail attachment device 225 of the guardrail attachment assembly 120 (shown in FIG. 1), with the corresponding guardrail strap 125 mounted thereto. In example aspects, the guardrail attachment device 225 can be substantially similar to the pillar attachment device 132 (shown in FIG. 1), though various features may be added, removed, or altered. As shown, the guardrail attachment device 225 can be comprise the substantially C-shaped mounting bracket 410. The mounting bracket 410 can define the bracket mounting wall 412, the upper bracket arm 414, and the lower bracket arm 416. The pair of the bracket holes 418 can be defined through the bracket mounting wall 412. The pair of bracket holes 418 can be configured to align with a corresponding pair of the inner guardrail fastener holes 330 (shown in FIG. 3B) formed through the guardrail post 110 (shown in FIG. 1). A corresponding one of the guardrail fastener assemblies 230 (shown in FIG. 2) can extend through each of the aligned inner guardrail fastener holes 330 and the bracket holes 418 to couple the guardrail attachment device 225 to the guardrail post 110. The upper mounting opening 422 (shown in FIG. 4) can be formed through the upper bracket arm 414 and the lower mounting opening 424 (shown in FIG. 4) can be formed through the lower bracket arm 416. Additionally, the upper bracket arm 414 can define the upper arm opening 426 between the upper mounting opening 422 and the bracket mounting wall 412, and the lower bracket arm 416 can define the lower arm opening 428 between the lower mounting opening 424 and the bracket mounting wall 412.

The strap mount 510 (shown in FIG. 5) can extend between the upper bracket arm 414 and the lower bracket arm 416. The inner mounting tube 530 (shown in FIG. 5) of the strap mount 510 can define the upper engagement portion 540 and the lower engagement portion 550 (shown in FIG. 5), which can rotationally engage each of the upper mounting opening 422 and the lower mounting opening 424, respectively, as described above. The upper engagement portion 540 can define the one or more ratchet engagement members 542 (e.g., the one or more engagement prongs 544), which can engage the ratchet 610 to couple the ratchet 610 to the strap mount 510. Furthermore, the pawl 430 can be pivotably mounted to the upper surface 415 of the upper bracket arm 414 by the pawl fastener 432. The pawl 430 can be biased to the engaged position by the pawl spring 2010 (shown in FIG. 20), wherein the pawl 430 can engage the ratchet 610 mounted on the strap mount 510. In the engaged position, the pawl 430 can be biased into engagement with a corresponding one of the ratchet recesses 616 to prohibit the ratchet 610 from rotating relative to the mounting bracket 410.

As shown, the guardrail strap 125 can be mounted to and rolled up around the strap mount 510. The guardrail strap 125 can be unrolled, or partially unrolled, to extend between adjacent guardrail posts 110 (such as from the first guardrail post 110a to the second guardrail post 110b, as shown in FIG. 1) by applying a pulling force to the guardrail strap 125. In example aspects, the pulling force can overcome the spring force of the pawl spring 2010 to allow the strap mount 510 and the ratchet 610 to rotate relative to the mounting bracket 410, as described above. The guardrail strap 125 can be unrolled to a sufficient length to extend tautly between the first and second guardrail posts 110*a,b*, and the free end 126 (shown in FIG. 14) of the guardrail strap 125 can be secured to the second guardrail post 110*b*, as described in further detail below.

In some aspects, the guardrail attachment device 225 can also define a bracket stop arm 910 extending from the bracket mounting wall 412 at a front bracket side 912 of the mounting bracket 410. In the present aspect, the bracket stop arm 910 can be arranged proximate to the lower bracket arm 416. The bracket stop arm 910 can be configured to abut the front post side 317 (shown in FIG. 13) of the corresponding guardrail post 110, as illustrated in FIG. 14. The bracket stop arm 910 can be configured to brace against the front post side 317 of the guardrail post 110 and to reinforce the guardrail attachment device 225 if the corresponding guardrail strap 125 is pushed towards the peripheral edge 248 (shown in FIG. 2) of the elevated slab 145 (shown in FIG. 1), for example, by a user leaning against the guardrail strap 125 or a loose object (e.g., a paint can) rolling or sliding into the guardrail strap 125.

Figure 10:
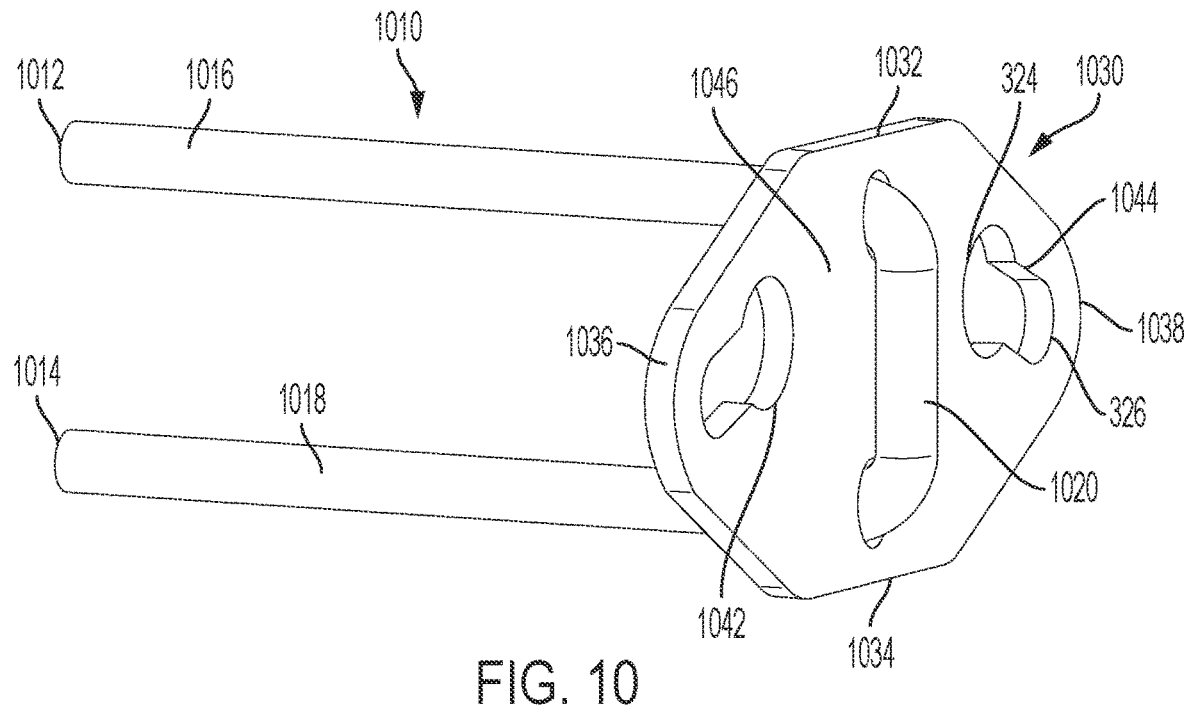
FIG. 10 is a perspective view of a coupling mechanism, in accordance with another aspect of the present disclosure.
Figure 11:
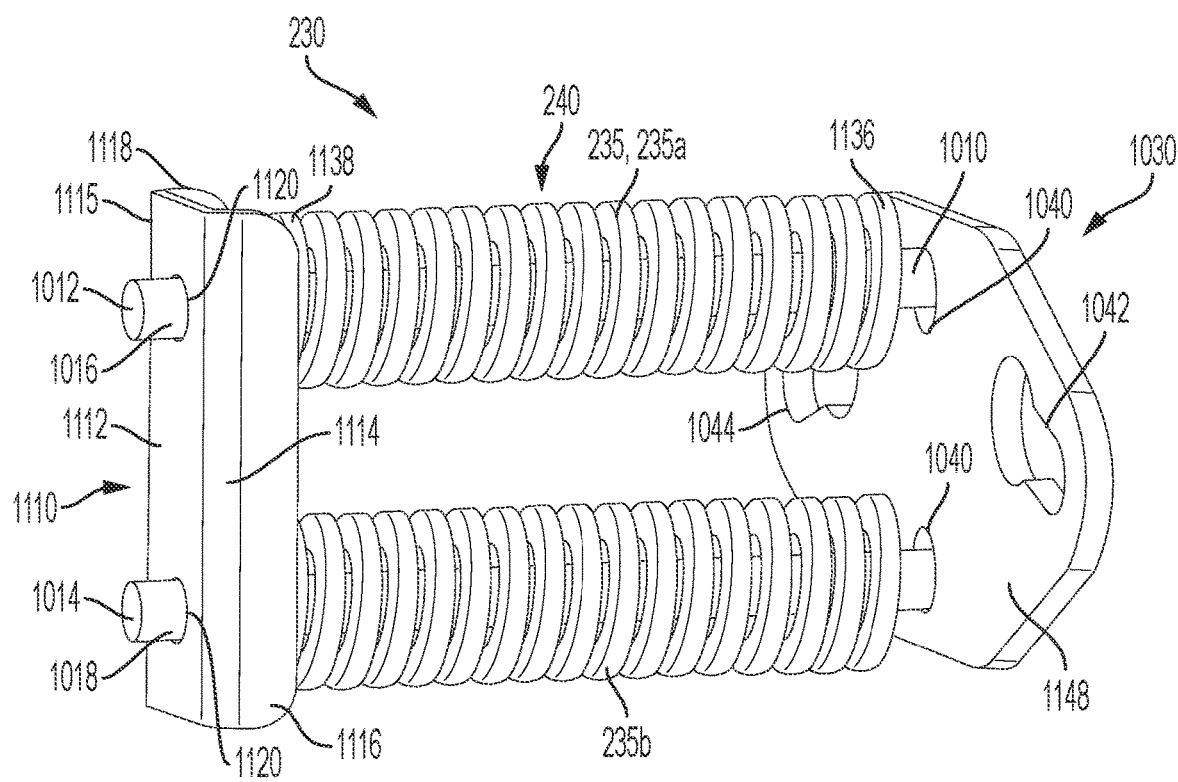
FIG. 11 is a perspective view of a pair of springs mounted to the coupling mechanism of FIG. 10.

FIG. 10 illustrates a guardrail fastener bolt 1010 of the guardrail fastener assembly 230 (shown in FIG. 11). The guardrail fastener bolt 1010 can defines an elongated U-shape having a first free end 1012 and a second free end 1014. The guardrail fastener bolt 1010 can comprise an upper bolt leg 1016 defining the first free end 1012 and a lower bolt leg 1018 defining the second free end 1014. As shown, the guardrail fastener bolt 1010 can further comprise a fastener bend 1020 connecting the upper bolt leg 1016 to the lower bolt leg 1018, distal to the first and second free ends 1012, 1014. Also illustrated is a fall arrest plate 1030 mounted on the U-shaped guardrail fastener bolt 1010. Example aspects of the fall arrest plate 1030 can define an upper plate end 1032, a lower plate end 1034 opposite the upper plate end 1032, a front plate side 1036, and a rear plate side 1038 opposite the front plate side 1036. The fall arrest plate 1030 can further define an outward plate surface 1046 and an inward plate surface 1148 (shown in FIG. 11) opposite the outward plate surface 1046. A pair of plate bolt holes 1040 can be formed through the fall arrest plate 1030, from the inward plate surface 1148 to the outward plate surface 1046. The plate bolt holes 1040 can be defined substantially centrally between the front plate side 1036 and the rear plate side 1038 of the fall arrest plate 1030. As shown, a first one of the plate bolt holes 1040 can be formed proximate to the upper plate end 1032 and a second one of the plate bolt holes 1040 can be formed proximate the lower plate end 1034. Each of the first free end 1012 and the second free end 1014 of the guardrail fastener bolt 1010 can extend through a corresponding one of the plate bolt holes 1040 to mount the fall arrest plate 1030 on the guardrail fastener bolt 1010. The fall arrest plate 1030 can be slid along the upper bolt leg 1016 and the lower bolt leg 1018 to abut the fastener bend 1020 of the guardrail fastener bolt 1010.

The fall arrest plate 1030 can further define a front safety attachment hole 1042 formed therethrough proximate to front plate side 1036 and a rear safety attachment hole 1044 formed therethrough proximate to the rear plate side 1038. In some aspects, each of the front and rear safety attachment holes 1042, 1044 can define the wide portion 324 and the narrow portion 326. According to example aspects, a user safety harness connected to a user (e.g., a construction worker) can be secured to the fall arrest plate 1030 by engagement with either or both of the front and rear safety attachment holes 1042, 1044, in order to tether the user to the fall protection system 100, as described in further detail below.

FIG. 11 illustrates an example aspect of the guardrail fastener assembly 230. As shown, the guardrail fastener assembly 230 can comprise the elongated guardrail fastener bolt 1010 and the fall arrest plate 1030 mounted thereon. The guardrail fastener assembly 230 can further comprise the guardrail springs 235, which can be compression springs in the present aspect. The guardrail springs 235 can comprise an upper guardrail spring 235*a* mounted on the upper bolt leg 1016 and a lower guardrail spring 235*b* mounted on lower bolt leg 1018. Each of the guardrail springs 235 can define a first spring end 1136 and a second spring end 1138, and the first spring end 1136 can be disposed proximate to the inward plate surface 1148 of the fall arrest plate 1030. Furthermore, a fastener bracket 1110 can be mounted on the upper bolt leg 1016 and the lower bolt leg 1018 proximate to the first free end 1012 and the second free end 1014, respectively, and the second spring end 1138 of each of the upper guardrail spring 235*a* and the lower guardrail spring 235*b* can abut the fastener bracket 1110. Thus, each of the upper guardrail spring 235*a* and the lower guardrail spring 235*b* can extend between the fastener bracket 1110 and the fall arrest plate 1030, as shown.

Example aspects of the fastener bracket 1110 can define a substantially vertical spring engagement wall 1112. A pair of bolt openings 1120 can be formed through the spring engagement wall 1112, and each of the first free end 1012 and the second free end 1014 of the guardrail fastener bolt 1010 can extend through a corresponding one of the bolt openings 1120. The spring engagement wall 1112 can further define a front wall side 1114 and a rear wall side 1115. The fastener bracket 1110 can comprise a front wall 1116 extending substantially perpendicularly from the spring engagement wall 1112 at the front wall side 1114 and a rear wall 1118 extending substantially perpendicularly from the spring engagement wall 1112 at the rear wall side 1115. Each of the front wall 1116 and the rear wall 1118 of the fastener bracket 1110 can extend alongside the upper and lower guardrail springs 235*a,b* in the direction of the fall arrest plate 1030. As shown, the upper and lower guardrail springs 235*a,b* can bias the fastener bracket 1110 away from the fall arrest plate 1030. However, upon the application of a suitable force, the upper and lower guardrail springs 235*a,b* can be compressed to draw the fastener bracket 1110 towards the fall arrest plate 1030, as described in further detail below.

Figure 12:
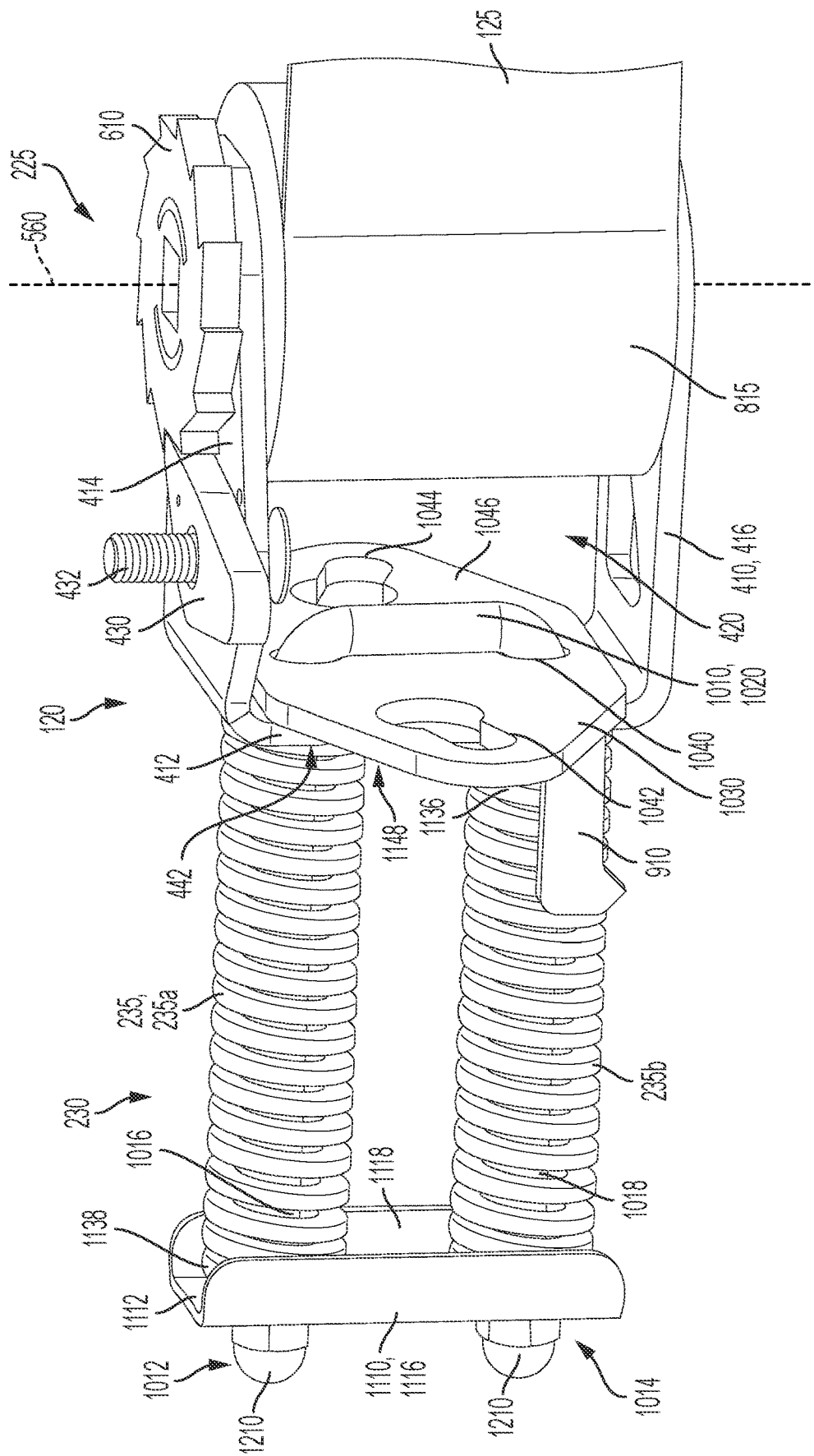
FIG. 12 is a perspective view of a guardrail attachment assembly comprising the coupling mechanism of FIG. 10 and the pair of springs of FIG. 11 coupled to the guardrail attachment device of FIG. 9.

FIG. 12 illustrates the guardrail attachment device 225 assembled with the guardrail fastener assembly 230 to define the guardrail attachment assembly 120. As shown, the mounting bracket 410 of the guardrail attachment device 225 can comprise the bracket mounting wall 412, the upper bracket arm 414, and the lower bracket arm 416. According to example aspects, the fall arrest plate 1030 of the guardrail fastener assembly 230 can abut the bracket mounting wall 412, and specifically, the inward plate surface 1148 of the fall arrest plate 1030 can abut the inner mounting wall surface 440 (shown in FIG. 4) of the bracket mounting wall 412, as shown. Each of the plate bolt holes 1040 formed through the fall arrest plate 1030 can be aligned with a corresponding one of the bracket holes 418 (shown in FIG. 4) formed through bracket mounting wall 412. Each of the upper bolt leg 1016 and the lower bolt leg 1018 of the guardrail fastener bolt 1010 can extend through a corresponding one of the plate bolt holes 1040 and corresponding one of the bracket holes 418. Thus, the fall arrest plate 1030 can be retained within the open bracket space 420 between the bracket mounting wall 412 and the fastener bend 1020 of the guardrail fastener bolt 1010.

Each of the upper and lower guardrail springs 235*a,b* can be mounted on the upper and lower bolt legs 1016, 1018, respectively, and the first spring ends 1136 can confront the outer mounting wall surface 442 of the bracket mounting wall 412. The fastener bracket 1110 can be mounted on the upper and lower bolt legs 1016, 1018 as described above, and the fastener bracket 1110 can abut the second spring ends 1138 of the upper and lower guardrail springs 235*a,b*. Thus, the upper and lower guardrail springs 235*a,b* can extend between the fastener bracket 1110 and the outer mounting wall surface 442 of the bracket mounting wall 412. In example aspects, an end cap 1210 can be secured to each of the upper and lower bolt legs 1016, 1018 at the first and second free ends 1012, 1014 thereof, respectively, to retain the upper and lower guardrail springs 235*a,b* and the fastener bracket 1110 on the guardrail fastener bolt 1010. For example, in some aspects, each of the first and second free ends 1012, 1014 of the guardrail fastener bolt 1010 can define external threading configured to matingly engage internal threading of the corresponding end cap 1210. The upper and lower guardrail springs 235*a,b* can naturally bias the fastener bracket 1110 away from the mounting bracket 410, as shown.

Figure 13:
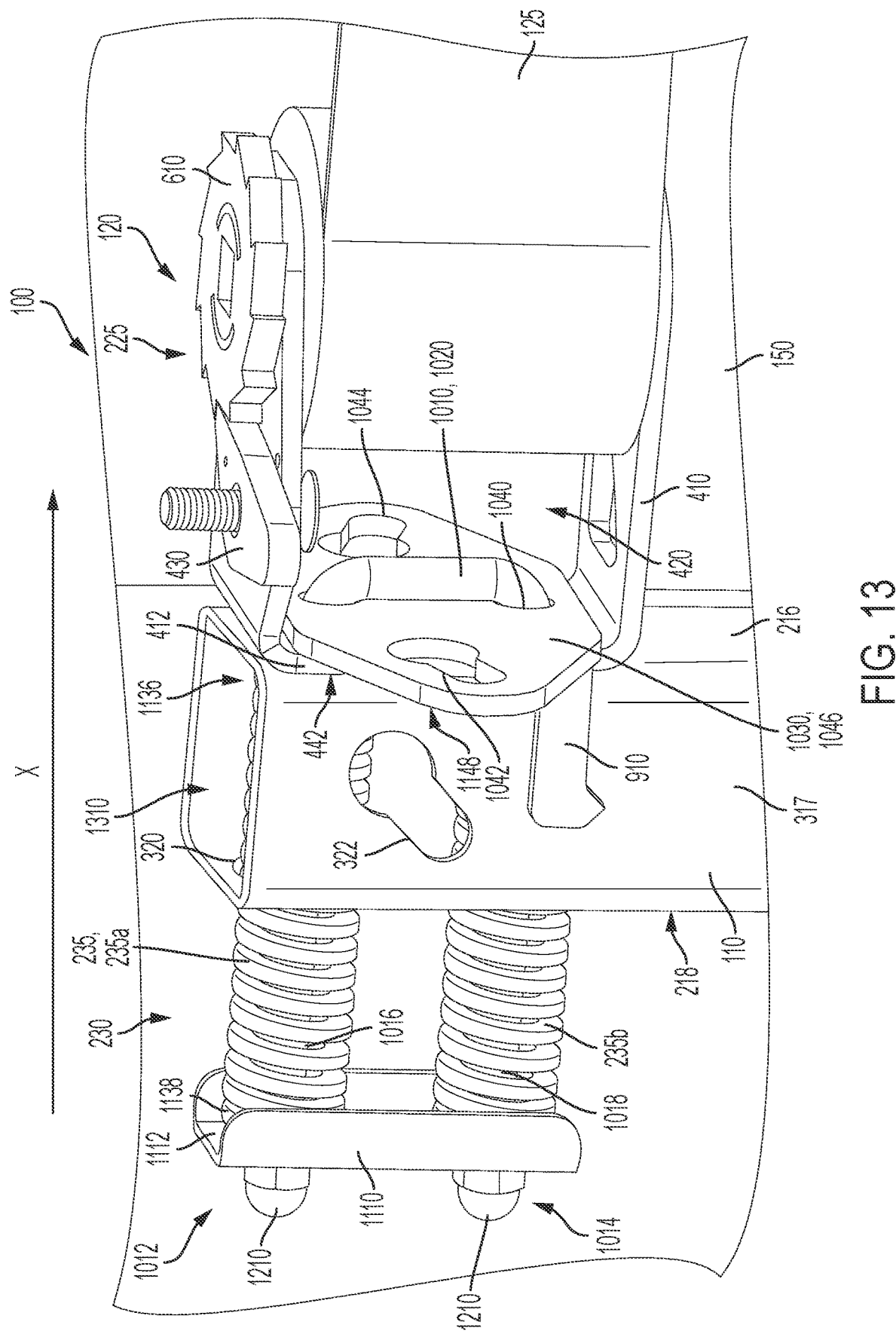
FIG. 13 is a perspective view of the guardrail attachment assembly of FIG. 9 coupled to the guardrail post of FIG. 2.
Figure 14:
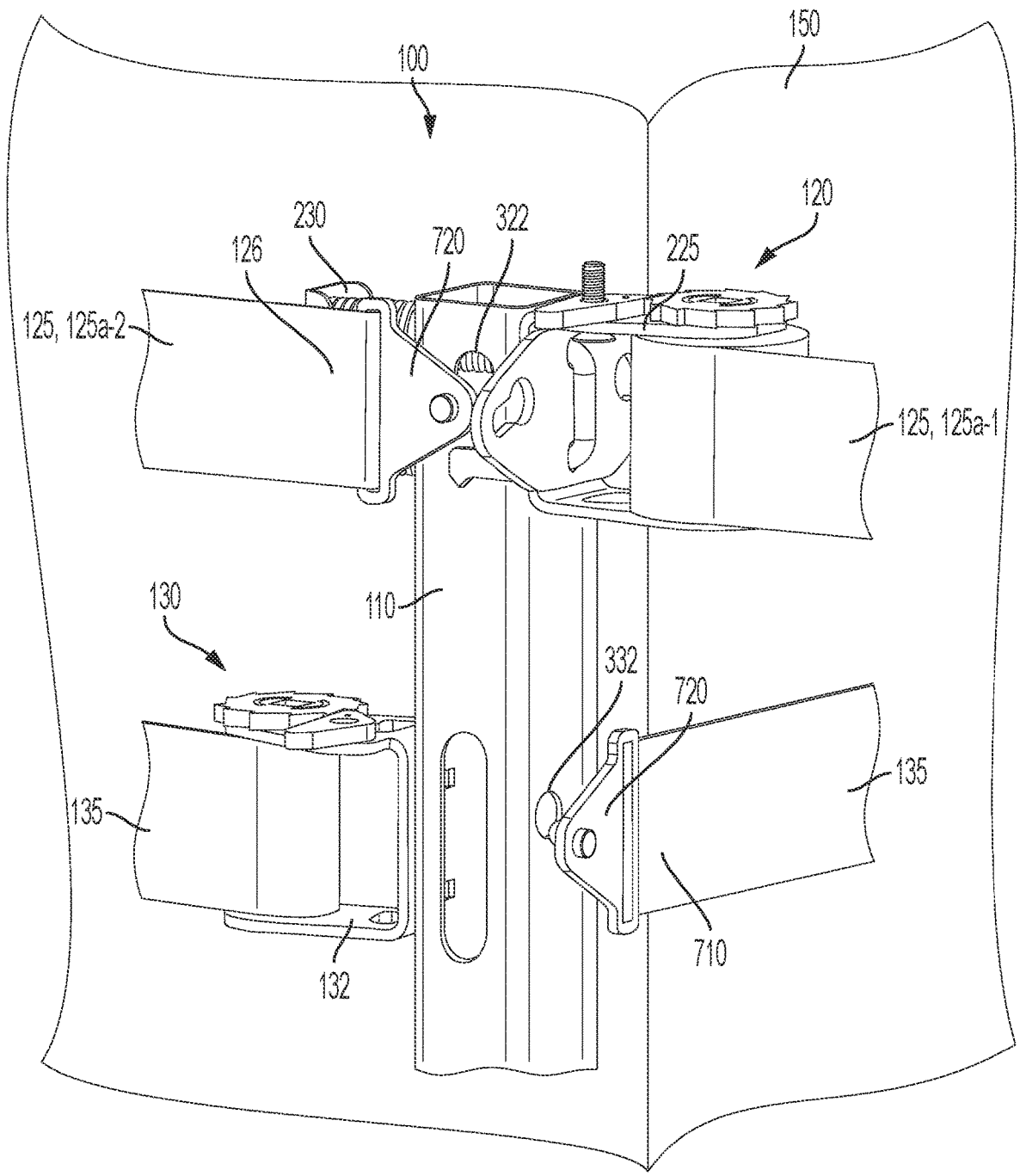
FIG. 14 is a perspective view of a second guardrail post of the fall protection system of FIG. 1.

FIG. 13 illustrates the guardrail attachment assembly 120 mounted to a corresponding one of the guardrail posts 110. The guardrail attachment assembly 120 can comprise the guardrail attachment device 225 and the guardrail fastener assembly 230 coupling the guardrail attachment device 225 to the guardrail post 110. The guardrail strap 125 can be mounted to the guardrail attachment device 225, and the ratchet 610 and the pawl 430 can allow the guardrail strap 125 to be unrolled from the guardrail attachment device 225 to extend between a pair of the guardrail posts 110. As shown, the guardrail fastener bolt 1010 can mount the fall arrest plate 1030 within the open bracket space 420 of the mounting bracket 410. The outer mounting wall surface 442 of the bracket mounting wall 412 can abut the inner post side 216 of the guardrail post 110. The upper and lower bolt legs 1016, 1018 of the guardrail fastener bolt 1010 can extend through the corresponding inner guardrail fastener holes 330 (shown in FIG. 3B) and outer guardrail fastener holes 320 of the guardrail post 110 to mount the guardrail attachment device 225 on the guardrail post 110. The upper and lower guardrail springs 235*a,b* can be mounted on the upper and lower bolt legs 1016, 1018, respectively, and can extend through the outer guardrail fastener holes 320, as shown. However, the inner guardrail fastener holes 330 formed through the inner post side 216 can be sized to prohibit the upper and lower guardrail springs 235*a,b* from passing therethrough, and thus, the first spring ends 1136 of the upper and lower guardrail springs 235*a,b* can engage the inner post side 216 within an interior 1310 of the guardrail post 110. The second spring ends 1138 of the upper and lower guardrail springs 235*a,b* can be disposed external to the guardrail post 110 and can abut the fastener bracket 1110, as shown.

The upper and lower guardrail springs 235*a,b* can naturally expand to bias the fastener bracket 1110 away from the guardrail post 110. The expansion of the upper and lower guardrail springs 235*a,b* can also draw the fastener bend 1020 of the guardrail fastener bolt 1010 towards the inner post side 216 of the guardrail post 110 to sandwich the bracket mounting wall 412 and the fall arrest plate 1030 therebetween. In some aspects, a user safety harness can be secured to the fall arrest plate 1030 via either or both of the front and rear safety attachment holes 1042, 1044. The user safety harness can further be secured to a user in order to tether the user to the fall protection system 100. Tethering the user to the fall protection system 100 can help prevent falls and/or can limit the distance that the user can fall. For example, in the event of a fall or a near fall, the weight of the user can impart a pulling force to the user safety harness. Because the user safety harness is attached to the fall arrest plate 1030, the pulling force can pull the fall arrest plate 1030 away from the guardrail post 110 generally in the direction X. The fall arrest plate 1030 can be biased against the fastener bend 1020 of the guardrail fastener bolt 1010 to slide the guardrail fastener bolt 1010 generally in the direction X. As the guardrail fastener bolt 1010 slides in the direction X, the upper and lower guardrail springs 235*a,b* can be compressed between the fastener bracket 1110 and the inner post side 216 of the guardrail post 110 to provide the fall protection system 100 with shock absorption when the user safety harness is suddenly pulled taut.

FIG. 14 illustrates the fall protection system 100 secured to a corresponding one of the pillars 150. The fall protection system 100 can comprise both the guardrail attachment assembly 120 and the pillar attachment assembly 130 mounted to a corresponding one of the guardrail posts 110. The pillar attachment assembly 130 can secure the guardrail post 110 to the corresponding pillar 150. As shown, the pillar attachment assembly 130 can comprise the pillar attachment device 132 and the pillar attachment strap 135 mounted to the pillar attachment device 132. The pillar attachment strap 135 can be unrolled and wrapped around the pillar 150, as described above. To secure the pillar attachment strap 135 around the pillar 150, the strap connector 720 coupled to the free end 710 of the pillar attachment strap 135 can engage the pillar locking hole 332 of the guardrail post 110.

The guardrail attachment assembly 120 can comprise the guardrail attachment device 225 and the guardrail fastener assembly 230. The guardrail fastener assembly 230 can couple the guardrail attachment device 225 to the guardrail post 110, as described above. Additionally, the guardrail strap 125 can be mounted on the guardrail attachment device 225. The guardrail strap 125 can be unrolled to extend between a pair of adjacent guardrail posts 110, as also described above. To secure the free end 126 of the guardrail strap 125 to the adjacent guardrail post 110, the strap connector 720 of the guardrail strap 125 can engage the guardrail locking hole 322 of the adjacent guardrail post 110. For example, in the present aspect, the illustrated guardrail post 110 can be a center guardrail post 110. A first upper guardrail strap 125*a*-1 can be mounted on the guardrail attachment device 225 that is secured to the illustrated guardrail post 110. The first upper guardrail strap 125*a*-1 can extend from the illustrated center guardrail post 110 to a right-side adjacent guardrail post 110 (not shown). Additionally, a second upper guardrail strap 125*a*-2 can extend from a left-side adjacent guardrail post 110 (not shown) to the illustrated center guardrail post 110. The strap connector 720 coupled to the free end 126 of the second upper guardrail strap 125*a*-2 can engage the guardrail locking hole 322 of the illustrated center guardrail post 110.

Figure 15:
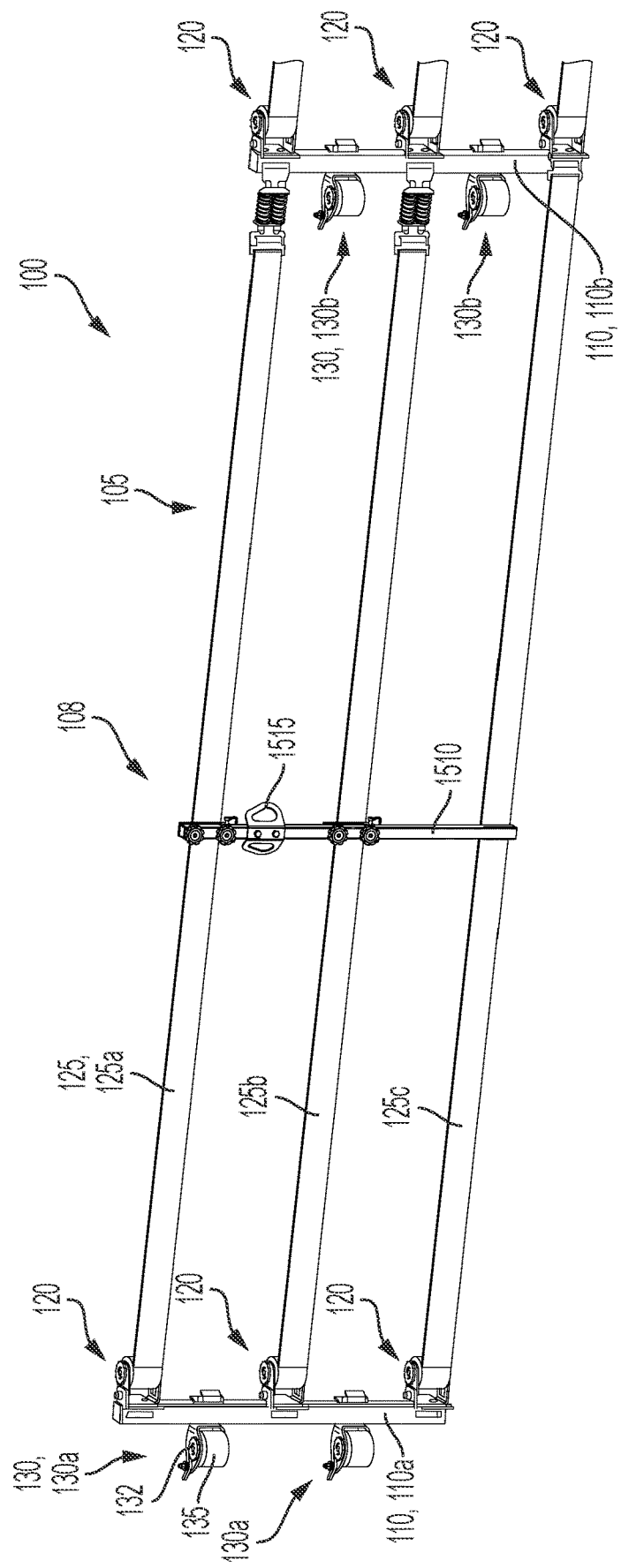
FIG. 15 is a perspective view of the fall protection system, in accordance with another aspect of the present disclosure.

FIG. 15 illustrates the fall protection system 100 in accordance with another aspect of the present disclosure. The fall protection system 100 can be secured to a structure under construction, such as the building structure 140 shown in FIG. 1, to prevent accidental falls from the elevated slab 145 (shown in FIG. 1) or elevated surface. Example aspects of the guardrail support frame 108 can comprise at least one of the substantially vertical guardrail post 110, and each of the guardrail posts 110 can be secured to a corresponding one of the vertical pillars 150 (shown in FIG. 1). In the present aspect, the guardrail posts 110 can comprise at least the first guardrail post 110*a* and the second guardrail post 110*b*, which can be secured to the first and second pillars 150*a,b* (shown in FIG. 1), respectively. The fall protection system 100 can further comprise one or more of the lateral safety guardrails 125 (i.e., the flexible guardrail straps 125) extending laterally between the first and second guardrail posts 110*a,b*. In other aspects, the lateral safety guardrails 125 can be semi-rigid or rigid. In the present aspect, the guardrail straps 125 can comprise the upper guardrail strap 125*a*, the middle guardrail strap 125*b*, and the lower guardrail strap 125*c*. Each of the guardrail straps 125 can be mounted to the first guardrail post 110*a* by a corresponding one of the guardrail attachment assemblies 120, as shown.

In some aspects, the guardrail support frame 108 can further comprise one or more substantially vertical reinforcement posts 1510 arranged between the adjacent guardrail posts 110 (e.g., the first and second guardrail posts 110*a,b*) and coupled to each of the guardrail straps 125. The reinforcement posts 1510 can be freestanding (i.e., not attached to the building structure 140) and can provide reinforcement to the guardrail straps 125 between the adjacent guardrail posts 110, which can be beneficial in building structures 140 wherein a significant distance is defined between adjacent pillars 150. Example aspects of the reinforcement posts 1510 can comprise a metal material, such as steel. In some aspects, the reinforcement posts 1510 can be formed as extruded steel posts, similar to the guardrail posts 110. In other aspects, the reinforcement posts 1510 can comprise any other suitable material known in the art, including but not limited to other metals, and/or can be manufactured using any other desired method. According to example aspects, the reinforcement post 1510 can comprise a fall arrest bracket 1515 to which a user safety harness can be attached and which is described in further detail below.

Example aspects of the fall protection system 100 can further comprise one or more of the pillar attachment assemblies 130. Each of the pillar attachment assemblies 130 can be configured to couple a corresponding one of the guardrail posts 110 to the corresponding vertical pillar 150 to ensure safe and proper functioning of the fall protection system 100. In the present aspect, the pillar attachment assemblies 130 can comprise a pair of the first pillar attachment assemblies 130*a* coupling the first guardrail post 110*a* to the first pillar 150*a* and a pair of the second pillar attachment assemblies 130*b* coupling the second guardrail post 110*b* to the second pillar 150*b*. Each pillar attachment assembly 130 can comprise the pillar attachment device 132 mounted to the corresponding guardrail post 110 and the pillar attachment strap 135 can be wrapped around the corresponding pillar 150 to secure the guardrail post 110 thereto.

Figure 16:
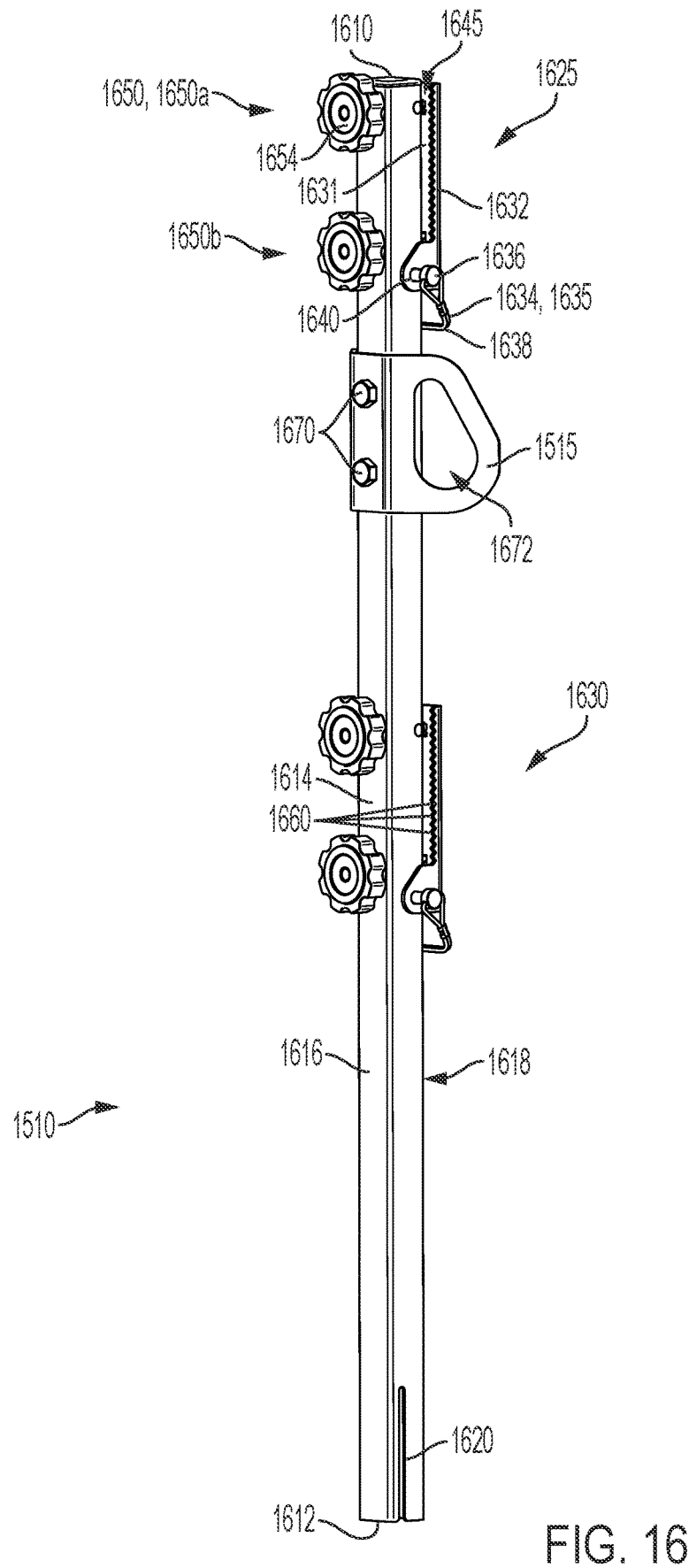
FIG. 16 is a front perspective view of a reinforcement post of the fall protection system of FIG. 15.
Figure 17:
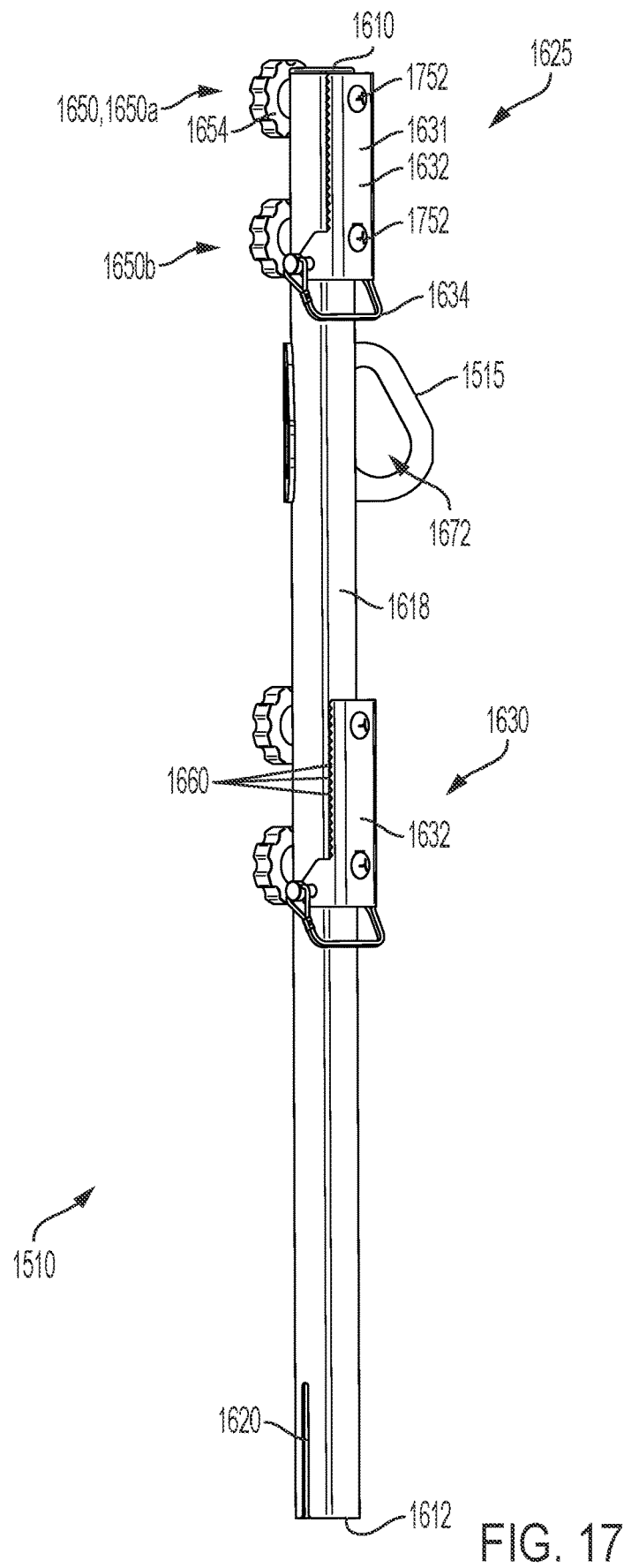
FIG. 17 is a rear perspective view of the reinforcement post of FIG. 16.

FIGS. 16 and 17 illustrate front and rear perspective views of the reinforcement post 1510. The reinforcement post 1510 can define an upper post end 1610, a lower post end 1612 opposite the upper post end 1610, and a middle post region 1614 therebetween. The lower post end 1612 can generally confront or rest on the upper floor surface 246 (shown in FIG. 2) of the elevated slab 145 (shown in FIG. 1), and the reinforcement post 1510 can extend substantially vertically upward therefrom, as shown. The reinforcement post 1510 can further define a front post side 1616 and a rear post side 1618 opposite the front post side 1616. According to example aspects, a strap engagement slot 1620 can extend substantially vertically into the reinforcement post 1510 at the lower post end 1612. The lower guardrail strap 125*c* (shown in FIG. 15) can extend laterally through the strap engagement slot 1620 to secure the lower guardrail strap 125*c* to the reinforcement post 1510. Additionally, an upper strap attachment mechanism 1625 can be coupled to the reinforcement post 1510 at or near the upper post end 1610 and a middle strap attachment mechanism 1630 can be coupled to the reinforcement post 1510 at or near the middle post region 1614. The upper strap attachment mechanism 1625 can secure the upper guardrail strap 125*a* (shown in FIG. 15) to the reinforcement post 1510, and the middle strap attachment mechanism 1630 can secure the middle guardrail strap 125*b* (shown in FIG. 15) to the reinforcement post 1510.

In example aspects, each of the upper strap attachment mechanism 1625 and the middle strap attachment mechanism 1630 can comprise a strap clamp 1632 that can be secured to the reinforcement post 1510 by a securing fastener 1634. The securing fastener 1634 can be, for example and without limitation, a lock pin 1635, as shown. In other aspects, the securing fastener 1634 can be any other suitable type of pin or fastener known in the art, including a bolt, a screw, or the like. The lock pin 1635 can comprise a straight pin rod 1636 and a substantially D-shaped pin lock 1638. In other aspects, the pin lock 1638 can be substantially C-shaped or can define any other suitable shape. The pin rod 1636 can extend through a pair of clamp mounting holes 1640 formed through the strap clamp 1632 and can further extend laterally through the reinforcement post 1510 to pivotably couple the strap clamp 1632 to the reinforcement post 1510. The D-shaped pin lock 1638 can prohibit the pin rod 1636 from disengaging the strap clamp 1632 and the reinforcement post 1510. According to example aspects, a strap channel 1645 can be defined between a clamp wall 1631 of the strap clamp 1632 and the rear post side 1618 of the reinforcement post 1510, and the corresponding guardrail strap 125 (shown in FIG. 15) can extend laterally through the strap channel 1645.

In some aspects, each of the upper strap attachment mechanism 1625 and the middle strap attachment mechanism 1630 can further comprise one or more adjustable clamp fasteners 1650 operable to adjust a width of the strap channel 1645. For example, the adjustable clamp fasteners 1650 to draw the clamp wall 1631 of the strap clamp 1632 towards the reinforcement post 1510 to clamp the corresponding guardrail strap 125 therebetween or can bias the clamp wall 1631 away from the reinforcement post 1510 to unclamp the guardrail strap 125. In the present aspect, each of the upper strap attachment mechanism 1625 and the middle strap attachment mechanism 1630 can comprise an upper clamp fastener 1650*a* and a lower clamp fastener 1650*b*. According to example aspects, each clamp fastener 1650 can comprise a threaded bolt 1752 (shown in FIG. 17) and a threaded adjustment knob 1654. Each threaded bolt 1752 can extend through the clamp wall 1631 and across the strap channel 1645. The threaded bolt 1752 can further extend through the reinforcement post 1510 from the front post side 1616 to the rear post side 1618. A distal end of the threaded bolt 1752 can extend beyond the rear post side 1618 and can engage the threaded adjustment knob 1654. In example aspects, the threaded bolt 1752 can be rotationally fixed relative to the clamp wall 1631, and the threaded adjustment knob 1654 can rotate on the threaded bolt 1752.

Because the threaded bolt 1752 is rotationally fixed, rotating the threaded adjustment knob 1654 on the threaded bolt 1752 can move the threaded adjustment knob 1654 along the threaded bolt 1752 linearly towards or away from the reinforcement post 1510. When tightened on the threaded bolt 1752 to a certain extent, the threaded adjustment knob 1654 can abut the front post side 1616. Further tightening the threaded adjustment knob 1654 can draw the threaded bolt 1752 further into the threaded knob 1654, thereby drawing the clamp wall 1631 towards the reinforcement post 1510 and sandwiching the corresponding guardrail strap 125 between the clamp wall 1631 and the reinforcement post 1510. In some aspects, the clamp wall 1631 can define a plurality of teeth 1660 extending inward towards the strap channel 1645 and configured to engage and grip the guardrail strap 125 to further secure the reinforcement post 1510 to the guardrail strap 125. In other aspects, any other suitable fasteners or fastening techniques can secure the reinforcement post 1510 to the guardrail straps 125.

In some aspects, the fall arrest bracket 1515 can be coupled to the reinforcement post 1510. In the present aspect, the fall arrest bracket 1515 can be coupled to the reinforcement post 1510 between the upper and middle strap attachment mechanisms 1625, 1630 by a pair of bracket fasteners 1670. The bracket fasteners 1670 can be bolts, screws, rivets, welding, or any other suitable fastener known in the art. As shown, the fall arrest bracket 1515 can define one or more safety attachment openings 1672 formed therethrough for securing the user safety harness to the fall arrest bracket 1515.

Figure 18:
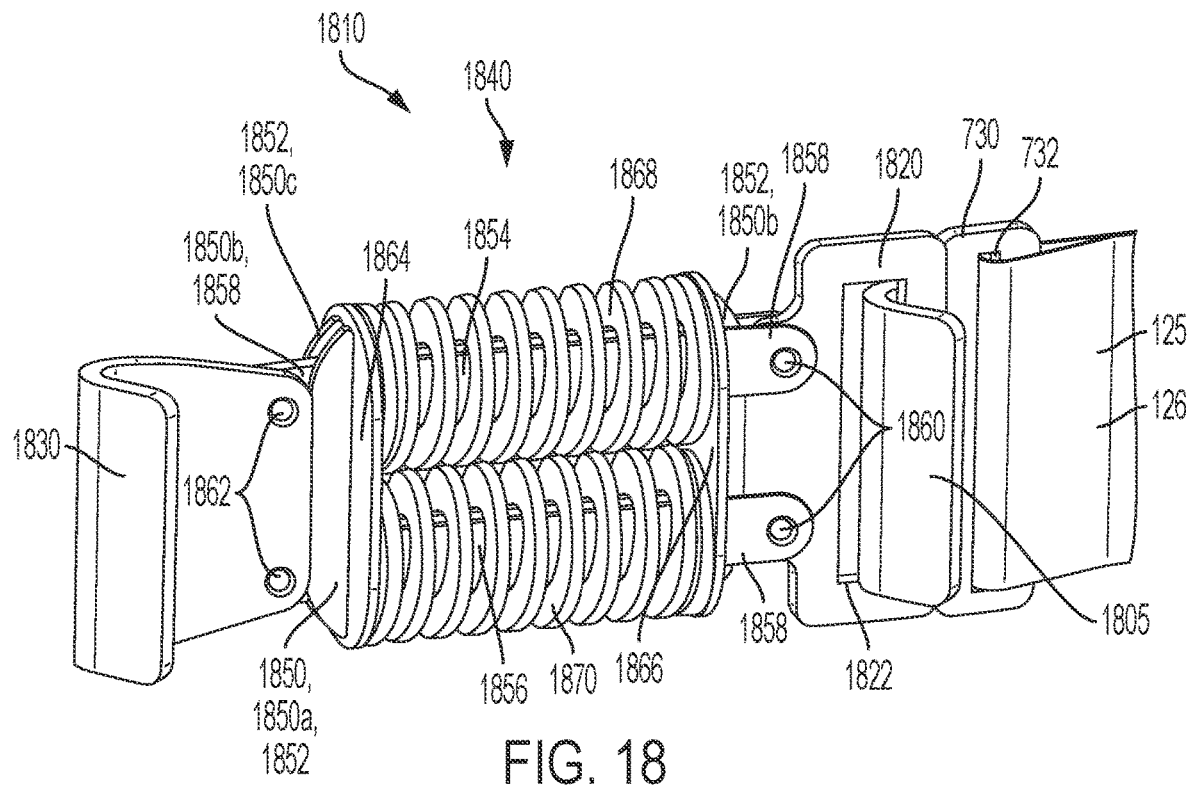
FIG. 18 is a rear perspective view of a shock absorption mechanism of the fall protection system of FIG. 15.
Figure 19:
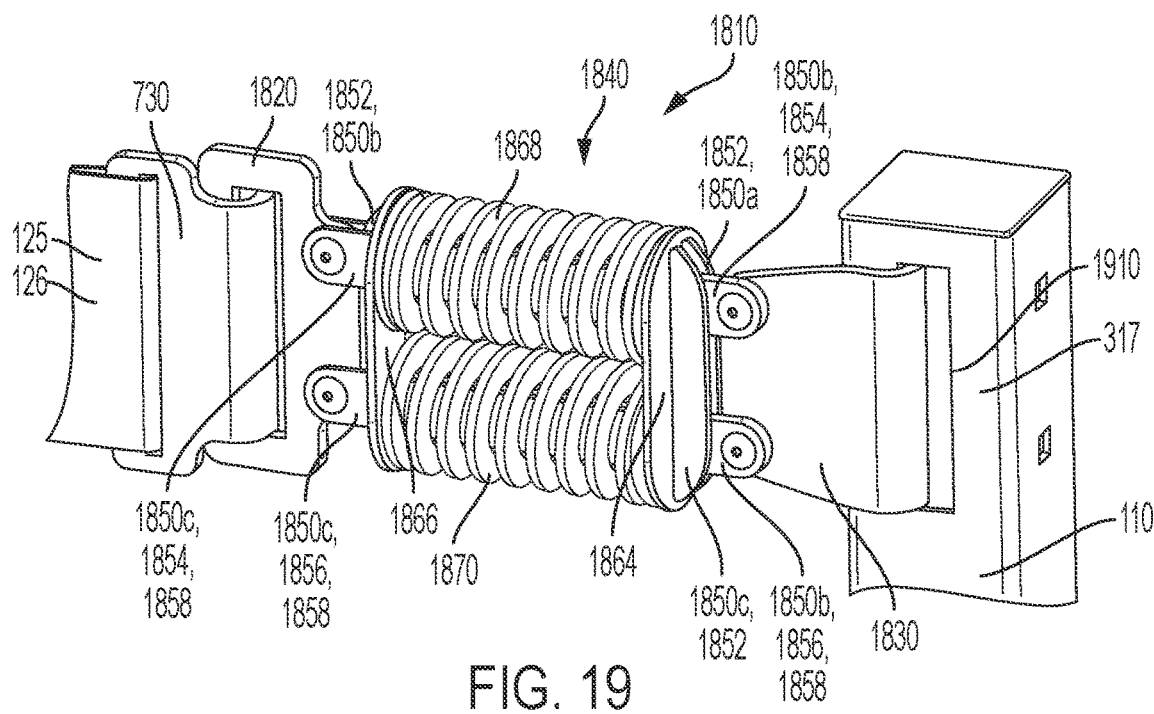
FIG. 19 is a front perspective view of the shock absorption mechanism of FIG. 18.

FIG. 18 illustrates the free end 126 of one of the guardrail straps 125 coupled to a shock absorption mechanism 1810. As shown, the free end 126 of the guardrail strap 125 can be coupled to the connector plate 730. The connector plate 730 of the present aspect can define the plate slot 732 through which the guardrail strap 125 can extend, and can further comprise a connector attachment hook 1805. Example aspects of the shock absorption mechanism 1810 can comprise a guardrail engagement mechanism, such as a tensioner clip 1820, and the tensioner clip 1820 can define a tensioner hook slot 1822 therethrough. The connector attachment hook 1805 can engage the tensioner hook slot 1822 to couple the connector plate 730 to the shock absorption mechanism 1810. The shock absorption mechanism 1810 can further comprise a tensioner attachment mechanism, such as a tensioner attachment hook 1830. The tensioner attachment hook 1830 can engage a post hook slot 1910 (shown in FIG. 19) formed in the front post side 317 (shown in FIG. 19) of the corresponding guardrail post 110 (shown in FIG. 19) to secure the shock absorption mechanism 1810 and the free end 126 of the guardrail strap 125 to the guardrail post 110. In some aspects, one or more of the guardrail straps 125 (such as the lower guardrail strap 125*c*, for example) may not be coupled to a corresponding one of the shock absorption mechanisms 1810, and instead, the connector attachment hook 1805 can directly engage the post hook slot 1910 of the guardrail post 110.

The shock absorption mechanism 1810 can further comprises a tensioner assembly 1840 extending between and coupling the tensioner clip 1820 to the tensioner attachment hook 1830. Example aspects of the tensioner assembly 1840 can comprise a plurality of tensioner plates 1850, such as a first outer tensioner plate 1850*a*, a second outer tensioner plate 1850*c*, and an inner tensioner plate 1850*b* disposed between the first and second outer tensioner plates 1850*a,c*. Each of the tensioner plates 1850 can define an elongated U-shape having a plate base 1852, an upper plate arm 1854, and a lower plate arm 1856. The plate base 1852 can be defined at a proximal end of the tensioner plate 1850, and the upper and lower plate arms 1854, 1856 can extend from the corresponding plate base 1852 to a distal end of the tensioner plate 1850. The upper and lower plate arms 1854, 1856 can be substantially parallel with one another. Each of the first and second outer tensioner plates 1850*a,c* can be oriented such that the plate bases 1852 of the first and second outer tensioner plates 1850*a,c* are adjacent to one another and disposed proximate to the tensioner attachment hook 1830. Additionally, a distal leg end 1858 of each of the upper and lower plate arms 1854, 1856 of the first and second outer tensioner plates 1850 can be coupled to the tensioner clip 1820 by corresponding clip fasteners 1860. The inner tensioner plate 1850*b* can be disposed between the first and second outer tensioner plates 1850*a,c* and can be oriented in the reverse direction, wherein the plate base 1852 can be disposed proximate to the tensioner clip 1820 and the distal leg ends 1858 of the upper and lower plate arms 1854, 1856 can be coupled to the tensioner attachment hook 1830 by corresponding hook fasteners 1862.

A first washer 1864 can be mounted on the upper and lower plate arms 1854, 1856 of the tensioner plates 1850 and can abut the plate bases 1852 of the first and second outer tensioner plates 1850*a,c*. A second washer 1866 can be mounted on the upper and lower plate arms 1854, 1856 of the tensioner plates 1850 and can abut the plate base 1852 of the inner tensioner plate 1850*b*. An upper tensioner spring 1868 can be mounted on the upper plate arms 1854 between the first and second washers 1864, 1866, and a lower tensioner spring 1870 can be mounted on the lower plate arms 1856 between the first and second washers 1864, 1866. The upper and lower tensioner springs 1868, 1870 can naturally expand to bias the first and second washers 1864, 1866 away from one another, thereby biasing the plate base 1852 of the inner tensioner plate 1850*b* away from the plate bases 1852 of the first and second outer tensioner plates 1850*a,c*, as shown.

The shock absorption mechanism 1810, similar to the guardrail fastener assemblies 230 described above, can be configured to provide shock absorption to the fall arrest system 100 (shown in FIG. 15) in the event of a fall, a near fall, or other similar event wherein a pushing force or a pulling force is applied to the guardrail straps 125. For example, as described above, a user safety harness can be coupled to the reinforcement post 1510 (shown in FIG. 15), which can be secured to the guardrail straps 125. If a pulling force is applied to the user safety harness, and thus to the reinforcement post 1510, such as by a user falling, the pulling force can be translated to the guardrail strap(s) 125 and to the tensioner clip 1820 of the shock absorption mechanism 1810. In another example, a user may lean against the guardrail strap(s) 125 to impart a pushing force thereto, which can be translated to the guardrail strap(s) 125 and to the tensioner clip 1820 of the shock absorption mechanism 1810. The tensioner clip 1820 can be pulled away from the tensioner attachment hook 1830, which can be stationarily secured to the guardrail post 110, and the tensioner assembly 1840 can lengthen and shorten between the tensioner clip 1820 and the tensioner attachment hook 1830 to provide said shock absorption. As described above, the distal leg ends 1858 of the first and second outer tensioner plates 1850*a,c* can be secured to the tensioner clip 1820, while the distal leg ends 1858 of the inner tensioner plate 1850*b* can be secured to the tensioner attachment hook 1830. As the tensioner clip 1820 is pulled away from the tensioner attachment hook 1830, the plate bases 1852 of the first and second outer tensioner plates 1850*a,c* can be drawn towards the plate base 1852 of the inner tensioner plate

1850b, compressing the upper and lower tensioner springs 1868, 1870 between the first and second washers 1864, 1866. The upper and lower tensioner springs 1868, 1870 can dampen the shock of the sudden pulling apart of the tensioner clip 1820 and the tensioner attachment hook 1830.

Figure 20:
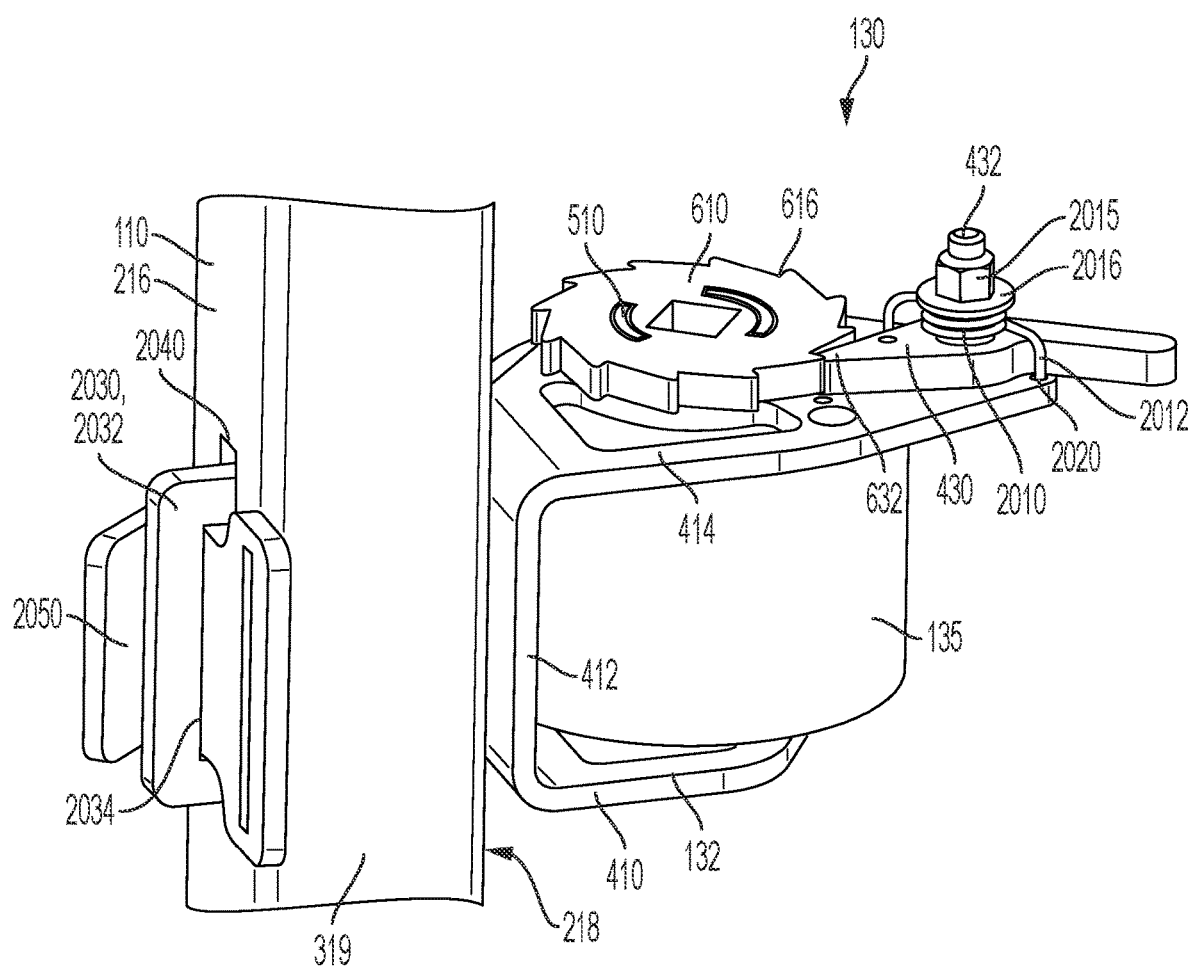
FIG. 20 is a rear perspective view of the pillar attachment assembly of the fall protection system of FIG. 15.

FIG. 20 illustrates a rear perspective view of the pillar attachment assembly 130 mounted to a corresponding one of the guardrail posts 110, in accordance with an example aspect of the present disclosure. As shown, the pillar attachment assembly 130 can comprise the pillar attachment device 132 and the pillar attachment strap 135. The pillar attachment device 132 can comprise the mounting bracket 410, the strap mount 510, the ratchet 610, and the pawl 430. The pawl 430 can be coupled to the mounting bracket 410 by the pawl fastener 432 and the engagement end 632 of the pawl 430 can be biased into engagement with a corresponding one of the ratchet recesses 616 by the pawl spring 2010. The pawl spring 2010 can also allow the pawl 430 to pivot out of engagement with the ratchet recess 616 upon application of a suitable force, as previously described. In the present aspect, the pawl spring 2010 can be mounted on the pawl fastener 432 between the pawl 430 and a threaded nut 2015, as shown. In some aspects, a pawl washer 2016 can be disposed between the pawl spring 2010 and the threaded nut 2015. A first pawl spring end 2012 of the pawl spring 2010 can be disposed on a first side of the pawl 430 and can engage a first spring opening 2020 in the upper bracket arm 414. A second pawl spring end 2112 (shown in FIG. 21) of the pawl spring 2010 can be disposed on an opposite second side of the pawl 430 and can engage a second spring opening 2120 (shown in FIG. 21) in the upper bracket arm 414.

The bracket mounting wall 412 can abut the outer post side 218 of the guardrail post 110. In the present aspect, the mounting bracket 410 can comprise a substantially vertical attachment wall 2030 extending perpendicularly from the bracket mounting wall 412 and through the guardrail post 110. For example, the attachment wall 2030 can extend through a pair of wall slots 2040 formed in the guardrail post 110. A first one of the wall slots 2040 can be formed through the outer post side 218, and a second one of the wall slots 2040 can be formed through the inner post side 216. An end portion 2032 of the attachment wall 2030 can extend beyond the inner post side 216 and a mounting slot 2034 can be defined therethrough. To securely attach the pillar attachment device 132 to the guardrail post 110, a pillar attachment hook 2050 can be hooked through the mounting slot 2034 and can engage the inner post side 216 to prevent disengagement of the attachment wall 2030 from the guardrail post 110. In the present aspect, the pillar attachment hook 2050 can formed substantially the same as the connector plate 730 of FIG. 18, which can be used for strapping the guardrail support frame 108 to the substantially vertical pillar 150.

Figure 21:
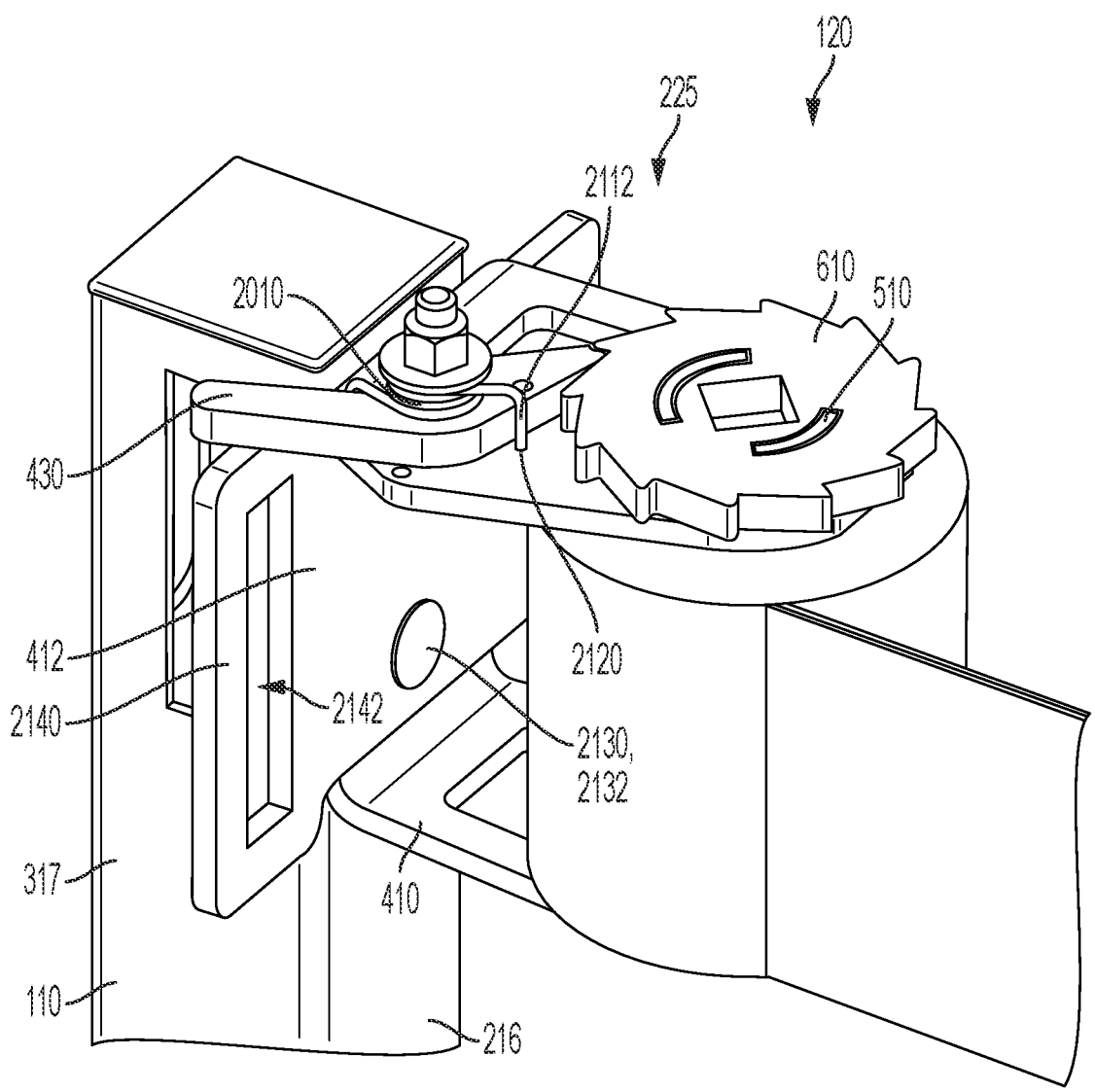
FIG. 21 is front perspective view of the guardrail attachment assembly of the fall protection system of FIG. 15.

FIG. 21 illustrates a rear perspective view of the guardrail attachment assembly 120 mounted to a corresponding one of the guardrail posts 110, in accordance with an example aspect of the present disclosure. As shown, the guardrail attachment assembly 120 can comprise the guardrail attachment device 225, and the guardrail strap 125 can be mounted thereto. The guardrail attachment device 225 can comprise the mounting bracket 410, the strap mount 510, the ratchet 610, and the pawl 430. In the present aspect, the bracket mounting wall 412 of the mounting bracket 410 can be directly affixed to the inner post side 216 of the guardrail post 110 by one or more wall fasteners 2130. The wall fasteners 2130 can be nut and bolt assemblies 2132, as shown, or can be any other suitable fastener known in the art, such as screws, rivets, welding, and the like. Additionally, in the present aspect, the bracket mounting wall 412 can define a flange portion 2140 extending beyond the front post side 317 of the guardrail post 110 and defining a flange slot 2142 therethrough, which can be used as an additional attachment opening for securing the user safety harness or for strapping the guardrail support frame 108 to the substantially vertical pillar 150.

One should note that the different aspects disclosed herein can be combined such that the pipe fitting can include the features of more than one aspect. One should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

It should be emphasized that the above-described aspects are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described aspect(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A fall protection system comprising:
 a guardrail support frame comprising a substantially vertical guardrail post, the guardrail post defining a locking hole, wherein the locking hole extends at an acute angle relative to horizontal plane;
 a lateral safety guardrail extending substantially horizontally from the guardrail post;
 a pillar attachment assembly comprising a pillar attachment device and a flexible pillar attachment strap, the pillar attachment device directly affixed to the guardrail post, and the flexible pillar attachment strap extending substantially horizontally from the pillar attachment device and configured to wrap around a structural component, wherein the pillar attachment strap defines a free end opposite the pillar attachment device; and
 a strap connector defining a connector slot and a locking portion, the free end of the pillar attachment strap looped through the connector slot to secure the free end to the strap connector, the locking portion engaging the locking hole of the guardrail post to releasably secure the free end to the guardrail post.

2. The fall protection system of claim 1, wherein the pillar attachment device comprises a mounting bracket directly affixed to the guardrail post and a strap mount rotatably coupled to the mounting bracket, and wherein the pillar attachment strap is rolled up around the strap mount.

3. The fall protection system of claim 2, wherein the pillar attachment device further comprises a ratchet coupled to the strap mount and a pawl pivotably coupled to the mounting bracket, the ratchet defining a plurality of ratchet teeth and ratchet recesses, and wherein the pawl is biased into engagement with one of the ratchet recesses.

4. The fall protection system of claim 3, wherein:
the mounting bracket comprises a mounting wall coupled to the guardrail post, a first bracket arm extending from the mounting wall, and a second bracket arm extending from the mounting wall;
the first bracket arm defines a first mounting opening, and the second bracket arm defines a second mounting opening; and
the strap mount extends between the first bracket arm and the second bracket arm and rotationally engages each of the first mounting opening and the second mounting opening.

5. The fall protection system of claim 4, wherein:
the strap mount comprises a mounting tube;
the mounting tube defines a tube body extending between the first bracket arm and the second bracket arm, a first engagement portion rotationally engaging the first mounting opening, and a second engagement portion rotationally engaging the second mounting opening;
the first engagement portion defines a ratchet engagement member extending beyond the first mounting opening; and
the ratchet engagement member engages the ratchet to couple the ratchet to the strap mount.

6. The fall protection system of claim 5, wherein:
the mounting tube is an inner mounting tube;
the strap mount further comprises an outer mounting tube disposed between the first bracket arm and the second bracket arm;
the inner mounting tube extends through the outer mounting tube; and
a restrained end of the pillar attachment strap is clamped between the inner mounting tube and the outer mounting tube.

7. The fall protection system of claim 1, further comprising a shock absorption mechanism, the shock absorption mechanism resiliently coupling the lateral safety guardrail to the guardrail support frame.

8. The fall protection system of claim 1, wherein:
the free end of the pillar attachment strap is secured to the pillar attachment strap to define a strap loop at the free end; and
a proximal end of the strap connector is retained within the strap loop.

9. The fall protection system of claim 1, wherein:
the locking hole defines a first portion and a second portion;
the locking hole angles downward from the first portion to the second portion; and
the locking portion of the strap connector engages the first portion and slides downward within the locking hole to the second portion to releasably secure the free end the pillar attachment strap to the guardrail post.

10. The fall protection system of claim 9, wherein:
the strap connector comprises a connector plate and connector bolt;
the connector bolt defines the locking portion; and
the locking portion of the connector bolt is received through the locking hole.

11. The fall protection system of claim 10, wherein:
the first portion of the pillar locking hole is a wide portion and the second portion of the pillar locking hole is a narrow portion;
the connector bolt defines a bolt rod and a bolt head, the bolt rod defining a width that is less that a width of the bolt head;
the width of the bolt head is less than a width of the wide portion and greater than a width of the narrow portion;
the bolt head is received through the wide portion and the bolt rod is slid into the narrow portion; and
the width of the bolt head prohibits disengagement of the bolt head from the pillar locking hole at the narrow portion.

* * * * *